(12) United States Patent
Ikeuchi

(10) Patent No.: US 7,828,755 B2
(45) Date of Patent: Nov. 9, 2010

(54) CONTROL DEVICE AND CONTROL PROGRAM FOR WALKING ASSIST APPARATUS

(75) Inventor: Yasushi Ikeuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1199 days.

(21) Appl. No.: 11/420,797

(22) Filed: May 29, 2006

(65) Prior Publication Data

US 2006/0270951 A1    Nov. 30, 2006

(30) Foreign Application Priority Data

May 27, 2005 (JP) ............................. 2005-155329
Apr. 28, 2006 (JP) ............................. 2006-125224

(51) Int. Cl.
*A61H 1/00* (2006.01)
(52) U.S. Cl. ................................ 601/5; 601/23; 601/35
(58) Field of Classification Search ...................... 601/5, 601/23, 33, 34, 35; 602/16, 23, 26; 482/51, 482/66, 74–79, 124; 623/24.27
See application file for complete search history.

(56) References Cited

U.S. PATENT DOCUMENTS 6,666,796 B1  12/2003  MacCready, Jr.

FOREIGN PATENT DOCUMENTS

| DE | 4408351 | 9/1994 |
|----|---------|--------|
| GB | 2278041 | 11/1994 |
| JP | 05-329186 | 12/1993 |
| JP | 2003-220102 | 8/2003 |

*Primary Examiner*—Quang D Thanh
(74) *Attorney, Agent, or Firm*—Rankin, Hill & Clark LLP

(57) ABSTRACT

A control device and a control program for a walking assist apparatus set a desired lifting force to act on a user from a seat and distribute the desired lifting force to each leg link of the walking assist apparatus according to the ratios of treading forces of the legs of the user measured on the basis of outputs of force sensors so as to determine the share for each leg link. Then, an actuator of each leg link is controlled to generate a force for the determined share. Thus, a force required for the user to support himself/herself with his/her leg or legs on a floor can be reduced while using a reduced number of parts to be attached to each leg of the user. Moreover, an assist force for achieving such a reduced required force can be properly shared between the leg links associated with the legs of the user.

18 Claims, 15 Drawing Sheets

CONTROL DEVICE AND CONTROL PROGRAM FOR WALKING ASSIST APPARATUS

BACKGROUND OF THE INVENTION

1. Field of the Invention

The present invention relates to a control device and a control program for a walking assist apparatus adapted to assist a user thereof with his/her walking.

2. Description of the Related Art

Hitherto, as this type of a walking assist apparatus, there has been known one disclosed in, for example, Japanese Unexamined Patent Application Publication No. H5-329186 (hereinafter referred to as "Patent Document 1"). In the walking assist apparatus (walking aid device) described in this Patent Document 1, supporting members are attached to the thigh, the crus, and the foot of each leg of a user thereof. In the walking assist apparatus, the joints connecting the supporting members are driven by actuators to impart desired motive forces to the user from the walking assist apparatus.

The walking assist apparatus described in Patent Document 1 mentioned above is capable of generating desired motive forces in a direction in which the user is moving so as to reduce the motive forces required to be produced by the user himself/herself. However, as it is obvious from FIG. 15 of Patent Document 1, the weight of a user is supported by the user himself/herself, resulting in an insufficient reduction of a load on the user. Furthermore, the one in Patent Document 1 does not have a technology for properly distributing a desired motive force to the legs of the walking assist apparatus, so that there has been a danger in that forces that do not match the motions of the legs of a user act on the legs of the user. Moreover, according to Patent Document 1, the supporting members of the walking assist apparatus are attached to the thigh, the crus, and the foot, respectively, of each leg of a user, and forces are applied from the supporting members to the thigh, the crus, and the foot of each leg. This has tended to cause the user to develop uncomfortable feeling.

SUMMARY OF THE INVENTION

The present invention has been made with a view of the background described above, and it is an object of the present invention to provide a control device and a control program for a walking assist apparatus that make it possible to reduce a force required for a user to support himself/herself with his/her leg or legs on a floor, while requiring a reduced number of parts to be attached to each leg of the user. It is another object of the present invention to provide a control device and a control program for a walking assist apparatus that make it possible to properly distribute an assist force for reducing the force required for a user to support himself/herself with his/her leg or legs on a floor between leg links associated with the legs of the user.

To this end, according to a first aspect of the present invention, there is provided a control device for a walking assist apparatus equipped with a seat that receives a part of the weight of a sitting user from above, a pair of right and left thigh frames respectively connected to the seat through the intermediary of first joints, a pair of right and left crus frames respectively connected to the thigh frames through the intermediary of second joints, a pair of right and left foot-worn assemblies that are respectively connected to the crus frames through the intermediary of third joints and respectively attached to the feet of the right and left legs of the user, and come in contact with the ground when the legs of the user become standing legs, an actuator for the left for driving the second joint among the joints of the left leg link composed of the first joint, the thigh frame, the second joint, the crus frame, the third joint, and the foot-worn assembly on the left side, and an actuator for the right for driving the second joint among the joints of the right leg link composed of the first joint, the thigh frame, the second joint, the crus frame, the third joint, and the foot-worn assembly on the right side, the control device including:

a treading force measurer for measuring the treading force of each leg of the user on the basis of a force detection value indicated by an output of a first force sensor provided in each of the foot-worn assemblies;

a desired lifting force setter for setting a desired lifting force, which is a desired value of an upward lifting force to be applied to the user from the seat;

a distributor for determining a desired share for the left leg link and a desired share for the right leg link out of the desired lifting force by distributing the desired lifting force to the leg links on the basis of the ratio between the treading force of the left leg and the treading force of the right leg of the user; and an actuator controller for controlling the actuator for the left such that the lifting force actually imparted to the seat from the left leg link becomes the desired share for the left leg link and also the actuator for the right such that the lifting force actually imparted to the seat from the right leg link becomes the desired share for the right leg link.

According to the first aspect of the invention described above, only the foot-worn assembly of the walking assist apparatus is attached to the foot of each leg. Moreover, a user has only to sit on the seat so that a part of his/her weight is rested thereon.

In the first aspect of the invention, the desired lifting force set by the desired lifting force setter is distributed on the basis of the ratio between the treading force of the right leg and the treading force of the left leg of a user measured by the treading force measurer. This determines a desired share of the left leg link and a desired share of the right leg link out of the desired lifting force. In this case, the ratio between the treading force of the right leg and the treading force of the left leg measured by the treading force measurer reflects an intention of a user how to support his/her weight by each leg on a floor. For instance, if the treading force of the left leg is larger than the treading force of the right leg, then it means that the user intends to support his/her weight mainly with his/her right leg. Thus, according to the first aspect of the invention, the desired lifting force is distributed to each leg link of the walking assist apparatus on the basis of the ratio between the treading force of the right leg and the treading force of the left leg of a user so as to determine the desired share of each leg link. This makes it possible to distribute desired lifting forces to the leg links such that they match the motion states of the legs desired by the user. In other words, based on the ratio between the treading force of the right leg and the treading force of the left leg, the ratio between a desired share of the right leg link and a desired share of the left leg link can be determined. To be more specific, for example, a desired share of the right leg link may be determined such that the proportion of the desired share of the right leg link to the desired lifting force is equal to the proportion of the right treading force to the total sum of the treading force of the right leg and the treading force of the left leg of the user. Similarly, a desired share of the left leg link may be determined such that the proportion of the desired share of the left leg link to the desired lifting force is equal to the proportion of the left treading force to the total sum of the treading force of the right leg and the treading force of the left leg of the user.

Furthermore, according to the first aspect of the invention, the actuator for the left is controlled such that the lifting force actually imparted to the seat from the left leg link becomes the desired share of the left leg link determined as described above. Similarly, the actuator for the right is controlled such that the lifting force actually imparted to the seat from the right leg link becomes the desired share of the right leg link determined as described above. Thus, the desired lifting force can be shared by the right and left leg links so as to match a motion state of each leg intended by the user, allowing the desired lifting force to be applied to the user from the seat. As a result, a load on each leg of the user can be effectively reduced.

Accordingly, the first aspect of the invention makes it possible to decrease the force required for a user to support himself/herself with his/her leg or legs on a floor, while using a reduced number of members to be attached to the legs of a user. Moreover, an assisting force (lifting force) for reducing the aforesaid force can be properly shared between the leg links associated with the individual legs of the user.

According to a second aspect of the present invention, there is provided a control device for a walking assist apparatus equipped with a seat that receives a part of the weight of a sitting user from above, a pair of right and left thigh frames respectively connected to the seat through the intermediary of first joints, a pair of right and left crus frames respectively connected to the thigh frames through the intermediary of second joints, a pair of right and left foot-worn assemblies that are respectively connected to the crus frames through the intermediary of third joints and respectively attached to the feet of the right and left legs of the user, and come in contact with the ground when the legs of the user become standing legs, an actuator for the left for driving the second joint among the joints of the left leg link composed of the first joint, the thigh frame, the second joint, the crus frame, the third joint, and the foot-worn assembly on the left side, and an actuator for the right for driving the second joint among the joints of the right leg link composed of the first joint, the thigh frame, the second joint, the crus frame, the third joint, and the foot-worn assembly on the right side, the control device including:

a treading force measurer for measuring the treading force of each leg of the user on the basis of a force detection value indicated by an output of a first force sensor provided in each of the foot-worn assemblies;

a desired lifting force setter for setting a desired lifting force, which is a desired value of an upward lifting force to be applied to the user from the seat;

a second force sensor provided between the bottom end of the crus frame and the third joint of each leg link or between the third joint and the foot-worn assembly of each leg link;

a force-to-be-controlled measurer for measuring, as a force to be controlled, a force actually transmitted from the floor to the crus frame of each leg link on the basis of a force detection value indicated by an output of the second force sensor;

a total desired lifting force determiner for determining, as a total desired lifting force, the total sum of the desired lifting force and the supporting force for supporting on a floor the weight obtained by subtracting the total weight of the portions under the second force sensors of the walking assist apparatus from the weight of the entire walking assist apparatus or the total sum of the desired lifting force and the supporting force for supporting the total weight of the walking assist apparatus on a floor;

a distributor for determining a desired share for the left leg link and a desired share for the right leg link out of the total desired lifting force by distributing the desired lifting force to the leg links on the basis of the ratio between a treading force of the left leg and a treading force of the right leg of the user; and an actuator controller for controlling the actuator for the left on the basis of a force-to-be-controlled and a desired share of the left leg link such that the difference between the force-to-be-controlled and the desired share of the left leg link approximates zero and for controlling the actuator for the right on the basis of a force-to-be-controlled and a desired share of the right leg link such that the difference between the force-to-be-controlled and the desired share of the right leg link approximates zero.

According to the second aspect of the invention, only the foot-worn assembly of the walking assist apparatus is attached to the foot of each leg of a user, as with the first aspect of the present invention. Moreover, the user has only to sit on the seat so that a part of his/her weight is rested thereon.

Furthermore, according to the second aspect of the invention, the total sum of a desired lifting force set by the desired lifting force setter and a supporting force for supporting, on a floor, the weight obtained by subtracting the total weight of the portions below the second force sensors of the walking assist apparatus from the weight of the entire walking assist apparatus (the weight will be hereinafter referred to as "weight X"), or the total sum of the desired lifting force and a supporting force for supporting the weight of the entire walking assist apparatus on a floor is determined as a total desired lifting force. The total desired lifting force means the supporting force for supporting the total sum of a load imparted to a seat from a user (a load balancing out a lifting force) and a gravitational force corresponding to the weight X or the weight of the entire walking assist apparatus on a floor by the links of both legs or by one leg link. Generally, the weight X and the weight of the entire walking assist apparatus are substantially equal.

According to the second aspect of the invention, the total desired lifting force is distributed according to the ratio between the treading force of the right leg and the treading force of the left leg of a user measured by the treading force measurer. Thus, the desired share of the left leg link and the desired share of the right leg link out of the total desired lifting force are determined. In this case, based on the ratio of the treading force of the right leg and the treading force of the left leg of the user, the total desired lifting force is distributed to each leg link of the walking assist apparatus and the desired share of each leg link is determined. Thus, as with the first aspect of the present invention described above, the ratio between a desired share of the right leg link and a desired share of the left leg link can be determined according to the ratio between the treading force of the right leg and the treading force of the left leg that reflects a motion of each leg desired by the user. To be more specific, as with the first aspect of the invention, for example, a desired share of the right leg link may be determined such that the proportion of a desired share of the right leg link to the total desired lifting force is equal to the proportion of a right treading force to the total sum of the treading force of the right leg and the treading force of the left leg of the user. The same applies to a desired share of the left leg link.

Further, according to the second aspect of the invention, the actuator for the left is controlled on the basis of a force-to-be-controlled of the left leg link measured by the force-to-be-controlled measurer and a desired share of the left leg link determined by the distributor such that the difference between the force-to-be-controlled of the left leg link and the desired share thereof approximates zero. Similarly, the actuator for the right is controlled on the basis of a force-to-be-controlled of the right leg link measured by the force-to-be-controlled measurer and a desired share of the right leg link determined by the distributor such that the difference between the force-to-be-controlled of the right leg link and the desired share thereof approximates zero.

In this case, the force-to-be-controlled of each leg link measured by the force-to-be-controlled measurer corresponds to an actual share of each leg link relative to the total supporting force for supporting a load actually imparted to the seat from a user, and a gravitational force corresponds to the weight X or the weight of the entire walking assist apparatus. Therefore, controlling each actuator as described above allows an actual share of each leg link to be precisely controlled to a desired share. At this time, an actual lifting force that acts on a user from the seat can be controlled to the desired lifting force.

Thus, the second aspect of the invention makes it possible to properly apply a set desired lifting force to a user from the seat by distributing a total desired lifting force to the right and left leg links such that the shares match a motion state of each leg desired by a user, while considering the weight of the walking assist apparatus. This permits a further effective reduction of a load on each leg of the user.

Thus, according to the second aspect of the invention, the force required for a user to support himself/herself with his/her leg or legs on a floor can be reduced, using a reduced number of members to be attached to each leg of the user. Furthermore, an assist force (lifting force) for achieving such a reduction can be properly shared between the leg links associated with the individual legs of the user.

Preferably, in the first aspect and the second aspect of the invention described above, each of the foot-worn assemblies is equipped with an annular member for inserting a foot of the user, to which the foot-worn assembly is to be attached, from the toe end thereof, and connected to the third joint through the intermediary of the annular member (a third aspect of the invention).

According to the third aspect of the invention, most of a load imparted from a user to the seat (the load balancing out the lifting force) and the weight of the entire walking assist apparatus can be applied to a floor through the intermediary of the annular members (more accurately, through the intermediary of the annular member of the foot-worn assembly attached to the foot of the leg that becomes a standing leg) without causing the load and the weight to act on the user. This enables the user to move each leg, hardly feeling the weight of the walking assist apparatus.

In the first to the third aspects of the invention, each of the first force sensors is composed of one or more force sensors provided in each foot-worn assembly such that, when, for example, a leg of the user stands, they are positioned between at least either the location of the metatarsophalangeal joint or the location of the heel of the foot on the bottom surface of the foot of the standing leg and a floor. In this case, the treading force measurer is preferably a means that takes the total sum of the force detection values indicated by outputs of the force sensors constituting the first force sensor of each foot-worn assembly as the force detection value of the first force sensor and measures the treading force of a leg of the user that has the foot-worn assembly attached thereto on the basis of the force detection value of the total sum (a fourth aspect of the invention).

With this arrangement, the treading force of each leg can be properly measured. Especially when force sensors are provided at both the location of the metatarsophalangeal joint and the location of the heel of the foot on the bottom surface of the foot of the user, the treading force of each leg can be properly measured regardless of the posture of each foot of the user relative to a floor. Moreover, a ground contact state of a leg or a walking state of a user can be detected more detailedly from outputs of both force sensors (force detection values) of the two force sensors. For instance, when the user climbs upstairs, even if there is an output (non-zero force detection value) from the force sensor at the location of the metatarsophalangeal joint, an output (force detection value) of the force sensor at the location of a heel is maintained practically at zero in some cases. When the user goes down a slope, an output of the force sensor at the heel tends to be larger than that of the force sensor at the metatarsophalangeal joint. Thus, if the force sensors are provided at both the metatarsophalangeal joint and the heel joint (more generally, if a plurality of force sensors, including the two force sensors, are provided), then a walking state of the user can be estimated from outputs of the force sensors and the estimation results can be used in the present invention.

In the fourth aspect of the invention, a force sensor may alternatively be provided only at either the metatarsophalangeal joint or the heel. In this case, the first force sensor will be composed of only one force sensor, so that the total sum of the force detection values of force sensors constituting the first force sensor will mean the force detection value indicated by an output of the one force sensor. Further, in the fourth aspect of the invention, if each foot portion is provided with an annular member, as with the second aspect of the invention, then each of the force sensors making up the first force sensor may be placed between the bottom portion of the annular member and the sole of the foot, or at the sole of the foot such that it is located further at the front or the rear relative to the bottom portion of the annular member.

In the third aspect of the invention described above, a foot supporting member for supporting a foot of the user may be disposed in the annular member of the foot-worn assembly such that it does not come in contact with the annular member, and the foot supporting member may be suspended in the annular member through the intermediary of the first force sensor (a fifth aspect of the invention). The phrase "the foot supporting member is suspended in the annular member through the intermediary of the first force sensor" means that the foot supporting member is suspended in the annular member through the intermediary of the first force sensor such that no force supporting the foot support member acts from below.

According to the fifth aspect of the invention, it is possible to apply a force (tensile force) that is as large as the treading force when a leg of the user stands to the first force sensor between the annular member and the foot supporting member. This allows the treading force of the standing leg of the user to be properly measured on the basis of a force detection value indicated by an output of the first force sensor.

The foot supporting member preferably has a plate-shaped portion (sole portion) in contact with substantially the entire bottom surface of the foot of the user. In this case, for example, both ends of an arched member are connected to both sides of the sole and the foot of the user is inserted in the arched member from the toe end, and the outer surface of the arched member is connected to the inner surface of the annular member through the intermediary of the first force sensor. Furthermore, in the fifth aspect of the invention, the first force sensor may be composed of a single force sensor or it may alternatively be composed of a plurality of force sensors.

In the first to the fifth aspects of the invention, preferably, if a force detection value of the first force sensor is a first threshold value or less, then the treading force measurer preferably sets a measurement value of the treading force of the foot to which the foot-worn assembly having the first force sensor is attached to zero (a sixth aspect of the invention).

This arrangement makes it possible to prevent a leg link having the foot-worn assembly from being subjected to a lifting force or a weight if a force detection value of the first force sensor is very small, that is, if a user does not wish to subject the leg carrying the foot-worn assembly equipped with the first force sensor to the lifting force or the weight. In addition, the influences of minute noises included in force detection values of the first force sensor can be removed.

Preferably, in the first to the sixth aspects of the invention, if a force detection value of the first force sensor is a predetermined second threshold value or more, then the treading force measurer obtains a predetermined upper limit value, which is set beforehand, as the measurement value of a treading force of the foot to which the foot-worn assembly having the first force sensor has been attached (a seventh aspect of the invention).

Usually, a treading force of each leg of a user detected from a force detection value of the first force sensor does not smoothly change. If the ratio between the treading forces of the two legs frequently changes, then the desired shares of the leg links also frequently change accordingly, often leading to impaired stability of the walking assist apparatus. For this reason, in the seventh aspect of the invention, the measurement values of the treading forces of feet are limited. This makes it possible to prevent the ratios of the treading forces of both legs from frequently changing especially in a period during which both legs of a user stand (so-called "two-leg supporting period"), thus permitting enhanced stability of the walking assist apparatus to be achieved. The second threshold value in the seventh aspect of the invention is larger than the first threshold value in the sixth aspect of the invention. When the sixth aspect and the seventh aspect of the invention are to be combined, if a force detection value of the first force sensor lies between the first threshold value and the second threshold value, then the measurement value of a treading force may be linearly changed from zero to the upper limit value according to detected values of the first force sensor.

Preferably, the control device for a walking assist apparatus in the first to the seventh aspects of the invention described above includes a displacement amount sensor that generates an output based on a displacement amount of the second joint, a joint displacement amount measurer for measuring a displacement amount of each second joint on the basis of an output of the displacement amount sensor, and a desired share corrector that determines a deviation of the interval between the third joint and the seat from a predetermined reference value on the basis of a measured displacement amount of the second joint of each leg link and then corrects the desired share of each leg link such that the deviation approximates zero (an eighth aspect of the invention).

This arrangement makes it possible to produce a restoring force (a restoring force produced by a spring or the like) for restoring an actual posture of a leg link to a posture, at which the interval between the third joint of the leg link and the seat agrees with the predetermined reference value, by an actuator associated with the leg link. At this time, if a user bends the knee of the leg such that the interval becomes smaller than the predetermined reference value, then the lifting force acting on the user from the seat increases, causing the user to easily feel the assist. Furthermore, the restoring force makes it possible to restrain a posture of each leg link from diverging to an inappropriate posture. The relative posture relationship between the thigh frame and the crus frame of each leg link is determined by a displacement amount of the second joint. Hence, by measuring a displacement amount of the second joint, the deviation of the interval between the third joint of the leg link and the seat from a predetermined reference value can be determined on the basis of the measurement value of the displacement amount.

Preferably, in the eighth aspect of the invention described above, to be more specific, the desired share corrector includes a device for determining a required force for bringing the deviation close to zero by a feedback control law on the basis of the deviation associated with the left leg link, a device for determining a correction amount of the desired share of the left leg link by multiplying the determined required force by the ratio of a treading force of the left leg relative to the total sum of a treading force of the left leg and a treading force of the right leg of the user so as to correct the desired share of the left leg link on the basis of the correction amount, a device for determining a required force for bringing the deviation close to zero by the feedback control law on the basis of the deviation associated with the right leg link, and a device for determining a correction amount of the desired share of the right leg link by multiplying the determined required force by the ratio of a treading force of the right leg relative to the total sum of a treading force of the left leg and a treading force of the right leg of the user so as to correct the desired share of the right leg link on the basis of the correction amount (a ninth aspect of the invention).

This arrangement makes it possible to generate, for each leg link, the restoring force on the basis of the ratio of treading force of the leg of the user on the appropriate leg link relative to the total sum of a treading force of the left leg and a treading force of the right leg of a user. Thus, the restoring force can be produced to enhance the stability of a posture of the walking assist apparatus without adding to a load on a leg of the user.

Preferably, the control device for a walking assist apparatus in the second aspect of the invention includes a selector switch for indicating whether to carry out lifting force control, wherein if the selector switch is in an operation state indicating that the lifting force control should be conducted, then the total desired lifting force determiner determines, as a total desired lifting force, the total sum of the desired lifting force and the supporting force for supporting on a floor the weight obtained by subtracting the total weight of the portions below the second force sensors of the walking assist apparatus from the weight of the entire walking assist apparatus or the total sum of the desired lifting force and the supporting force for supporting the weight of the entire walking assist apparatus on a floor, and if the selector switch is in an operation state indicating that the lifting force control should not be carried out, then the total sum of the forces-to-be-controlled of both leg links measured by the force-to-be-controlled measurer is determined as the total desired lifting force (a tenth aspect of the invention).

Preferably, as with the aforesaid eighth aspect of the invention, when the control device for a walking assist apparatus in the second aspect of the invention described above includes a selector switch for indicating whether to carry out the lifting force control in addition to the displacement amount sensor of the second joint and the desired share corrector, if the selector switch is in a state indicating that the lifting force control should be conducted, then the total desired lifting force determiner determines, as a total desired lifting force, the total sum of the desired lifting force and the supporting force for supporting on a floor the weight obtained by subtracting the total weight of the portions below the second force sensors of the walking assist apparatus from the weight of the entire walking assist apparatus or the total sum of the desired lifting force and the supporting force for supporting the weight of the entire walking assist apparatus on a floor, and if the selector switch is in an operation state indicating that the lifting force control should not be conducted, then the total desired lifting force determiner determines, as a total desired lifting force, the value obtained by subtracting a correction amount of the desired share of each of both leg links determined by the desired share corrector from the total sum of the forces-to-be-controlled of both leg links measured by the force-to-be-controlled measurer (an eleventh aspect of the invention).

In the tenth aspect and the eleventh aspect of the invention, if the selector switch is in the state indicating not to control the lifting force, then it is basically a balanced state in which no force acts between a user and the seat. In other words, it is possible to maintain a state wherein the seat is in contact with a user while preventing a lifting force from being applied to the user from the seat. This enables the user to easily sit on the seat. In this state, if the switch is changed to the operation state indicating that the lifting force control should be conducted, then the desired lifting force acts on the user from the seat. Thus, smooth switching between the mode in which a lifting force acts on a user and the mode in which no lifting force acts on the user can be accomplished.

In the tenth aspect of the invention, the technical constructions of the third to the ninth aspects of the invention described above may be combined. In the eleventh aspect of the invention, the technical constructions of the third to the seventh inventions may be combined. Further, in the eleventh aspect of the invention, the desired share corrector is preferably constructed as in the ninth aspect of the invention, to be more specific.

According to a twelfth aspect and a thirteenth aspect of the present invention, there is provided a control program for a walking assist apparatus. According to the twelfth aspect of the invention, there is provided a control program that causes a computer for controlling a walking assist apparatus equipped with a seat that receives from above a part of the weight of a sitting user, a pair of right and left thigh frames respectively connected to the seat through the intermediary of first joints, a pair of right and left crus frames respectively connected to the thigh frames through the intermediary of second joints, a pair of right and left foot-worn assemblies that are respectively connected to the crus frames through the intermediary of third joints, respectively attached to the feet of the right and left legs of the user, and come in contact with the ground when the legs of the user stand, an actuator for the left for driving the second joint among the joints of the left leg link composed of the first joint, the thigh frame, the second joint, the crus frame, the third joint, and the foot-worn assembly on the left side, an actuator for the right for driving the second joint among the joints of the right leg link composed of the first joint, the thigh frame, the second joint, the crus frame, the third joint, and the foot-worn assembly on the right side, and a first force sensor provided in each of the foot-worn assemblies for measuring a treading force of each leg of the user, to carry out:

processing for capturing an output of the first force sensor and measuring a treading force of each leg of the user on the basis of a force detection value indicated by the output;

processing for capturing a set value of a desired lifting force, which is a desired value of an upward lifting force to be applied to the user from the seat, and distributing the set value of the desired lifting force on the basis of a ratio between the treading force of the left leg and the treading force of the right leg of the user so as to determine a desired share of the left leg link and a desired share of the right leg link out of the desired lifting force; and processing for generating a control output for controlling the actuator for the left such that a lifting force actually imparted to the seat from the left leg link is equal to the determined desired share of the left leg link and also generating a control output for controlling the actuator for the right such that a lifting force actually imparted to the seat from the right leg link is equal to the determined desired share of the right leg link.

According to the control program of the twelfth aspect of the invention, each actuator is controlled by a computer, as with the first aspect of the invention. This makes it possible to divide a desired lifting force between the right and left leg links so as to match a motion state (the state of a ratio between the treading forces of the legs) intended by a user and to cause the desired lifting force to act on the user from the seat. As a result, a load on each leg of the user can be effectively reduced.

Thus, according to the twelfth aspect of the invention, as with the first aspect of the invention, the force required for a user to support himself/herself with his/her leg or legs on a floor can be reduced, while requiring a reduced number of members to be attached to each leg of the user. Furthermore, an assisting force (lifting force) for achieving such a reduction can be properly shared by the leg links associated with the individual legs of the user.

Further, according to a thirteenth aspect of the invention, there is provided a control program that causes a computer for controlling a walking assist apparatus equipped with a seat that receives from above a part of the weight of a sitting user, a pair of right and left thigh frames respectively connected to the seat through the intermediary of first joints, a pair of right and left crus frames respectively connected to the thigh frames through the intermediary of second joints, a pair of right and left foot-worn assemblies that are respectively connected to the crus frames through the intermediary of third joints, respectively attached to the feet of the right and left legs of the user, and come in contact with the ground when the legs of the user stand, an actuator for the left for driving the second joint among the joints of the left leg link composed of the first joint, the thigh frame, the second joint, the crus frame, the third joint, and the foot-worn assembly on the left side, an actuator for the right for driving the second joint among the joints of the right leg link composed of the first joint, the thigh frame, the second joint, the crus frame, the third joint, and the foot-worn assembly on the right side, a first force sensor provided in each of the foot-worn assemblies for measuring a treading force of each leg of the user, and a second force sensor provided between the bottom end of the crus frame and the third joint of each of the leg links or between the third joint of each of the leg links and the foot-worn assembly, to carry out:

processing for capturing an output of the first force sensor and measuring a treading force of each leg of the user on the basis of a force detection value indicated by the output;

processing for capturing an output of the second force sensor and measuring, as a force-to-be-controlled, the force transmitted to the crus frame of each leg link from the floor on the basis of the force detection value indicated by the output;

processing for capturing a set value of a desired lifting force, which is a desired value of an upward lifting force to be applied to the user from the seat, and determining, as a total desired lifting force, the total sum of a set value of the desired lifting force and the supporting force for supporting on a floor the weight obtained by subtracting the total weight of the portions below the second force sensors of the walking assist apparatus from the weight of the entire walking assist apparatus or the total sum of the desired lifting force and the supporting force for supporting the weight of the entire walking assist apparatus on a floor;

processing for distributing the determined total desired lifting force to the leg links according to the ratio between a treading force of the left leg and a treading force of the right leg of the user, thereby determining a desired share of the left leg link and a desired share of the right leg link out of the total desired lifting force; and processing for generating a control output for controlling the actuator for the left such that the difference between a force-to-be-controlled of the left leg link and a desired share approximates zero on the basis of the force-to-be-controlled of the left leg link and the desired share and also for generating a control output for controlling the actuator for the right such that the difference between a force-to-be-controlled of the right leg link and a desired share approximates zero on the basis of the force-to-be-controlled of the right leg link and the desired share.

According to the thirteenth aspect of the invention, as with the second aspect of the invention, a set desired lifting force can be properly applied to a user from a seat, while dividing a total desired lifting force between the right and left leg links so as to match a motion state (the state of a ratio between the treading forces of the legs) intended by a user, with considerations given to the weight of the walking assist apparatus. As a result, a load on each leg of the user can be effectively reduced.

Thus, according to the thirteenth aspect of the invention, the force required for a user to support himself/herself with his/her leg or legs on a floor can be reduced, while requiring a reduced number of members to be attached to each leg of the user. Furthermore, an assisting force (lifting force) for achieving such a reduction can be properly shared by the leg links associated with the individual legs of the user.

In the twelfth aspect and the thirteenth aspect of the invention, the walking assist apparatus is preferably equipped with annular members, as with the third aspect of the invention. In this case, as with the aforesaid fifth aspect of the invention, the foot supporting member may be provided and it may be suspended in the annular member through the intermediary of the first force sensor. In such a case, the first force sensor may be composed of a single force sensor or it may alternatively be composed of a plurality of force sensors.

Preferably, in the twelfth aspect and the thirteenth aspect, if each of the first force sensors is composed of one or more force sensors provided in each of the foot-worn assemblies such that, when a leg of the user becomes a standing leg, the force sensor or the force sensors are positioned between at least one of the location of the metatarsophalangeal joint and the location of the heel of the foot on the bottom surface of the foot of the standing leg and a floor, then the processing for measuring the treading force is the processing for taking the total sum of the force detection values indicated by outputs of the force sensors constituting the first force sensor of each foot-worn assembly as the force detection value of the first force sensor and measuring the treading force of the leg of the user, to which the foot-worn assembly has been attached, on the basis of the force detection value (a fourteenth aspect of the invention).

According to the fourteenth aspect of the invention, the treading forces of the legs can be properly measured, as with the fourth aspect of the invention described above. Especially when force sensors are provided at both the location of the metatarsophalangeal joint and the location of the heel of the foot on the bottom surface of the foot of the user, the treading force of each leg can be properly measured regardless of the posture of each foot of the user relative to a floor. Furthermore, if a plurality of force sensors, including the force sensors at the location of the metatarsophalangeal joint and the force sensors at the location of the heel, are provided, then a walking state of the user can be estimated from outputs of the force sensors, and the estimation result can be applied to the present invention.

Preferably, in the twelfth aspect to the fourteenth aspect of the invention, the processing for measuring treading forces is the processing for setting the measurement value of a treading force of the foot, to which the foot-worn assembly having the first force sensor has been attached, to zero if a force detection value of the first force sensor is a predetermined first threshold value or less (a fifteenth aspect of the invention).

According to the fifteenth aspect of the invention, as with the sixth aspect of the invention, it is possible to prevent a leg link from being subjected to a lifting force or a weight if a force detection value of the first force sensor is very small. In addition, the influences of minute noises included in force detection values of the first force sensor can be removed.

Preferably, in the twelfth aspect to the fifteenth aspect of the invention, the processing for measuring treading forces is the processing for taking a predetermined upper limit value, which is set beforehand, as the measurement value of a treading force of the foot, to which the foot-worn assembly having the first force sensor has been attached, if a force detection value of the first force sensor is a predetermined second threshold value or more (a sixteenth aspect of the invention).

With this arrangement, as with the seventh aspect of the invention, it is possible to restrain the ratio of the treading forces of the two legs from frequently changing especially in a period during which both legs of a user stand (a so-called "two-leg supporting period"), thus permitting enhanced stability of the walking assist apparatus to be achieved. The second threshold value in the sixteenth aspect of the invention is larger than the first threshold value in the fifteenth aspect of the invention. When the fifteenth aspect and the sixteenth aspect of the invention are to be combined, if a force detection value of the first force sensor lies between the first threshold value and the second threshold value, the measurement value of a treading force may be linearly changed from zero to the upper limit value according to detected values of the first force sensor.

Preferably, in the twelfth aspect to the sixteenth aspect of the invention, the walking assist apparatus includes a displacement amount sensor that generates an output based on a displacement amount of the second joint, and causes the computer to perform processing for capturing an output of the displacement amount sensor, measuring the displacement amount of each second joint on the basis of the output, and determining the deviation of the interval between the third joint and the seat from a predetermined reference value on the basis of the measured displacement amount of the second joint of each of the leg links, and another processing for correcting the desired share of each leg link such that the determined deviation approximates zero (a seventeenth aspect of the invention).

This arrangement, as with the aforesaid eighth aspect of the invention, makes it possible to produce a restoring force (a restoring force produced by a spring or the like) for restoring an actual posture of a leg link to a posture, at which the interval between the third joint of each leg link and the seat agrees with the predetermined reference value, by an actuator associated with the leg link. At this time, if a user bends the knee of the leg such that the interval becomes smaller than the predetermined reference value, then the lifting force acting on the user from the seat increases, causing the user to easily feel the assist. Furthermore, the restoring force makes it possible to restrain a posture of each leg link from diverging to an inappropriate posture.

Further, in the seventeenth aspect of the invention, preferably, the processing for correcting a desired share is composed of processing for determining a required force for bringing the deviation close to zero by a feedback control law on the basis of the deviation associated with the left leg link, processing for multiplying the determined required force by the ratio of a treading force of the left leg relative to the total sum of a treading force of the left leg and a treading force of the right leg of the user and then determining a correction amount of the desired share of the left leg link so as to correct the desired share of the left leg link on the basis of the correction amount, processing for determining a required force for bringing the deviation close to zero by the feedback control law on the basis of the deviation associated with the right leg link, and processing for multiplying the determined required force by the ratio of a treading force of the right leg relative to the total sum of a treading force of the left leg and a treading force of the right leg of the user so as to determine a correction amount of the desired share of the right leg link, and then correcting the desired share of the right leg link on the basis of the correction amount (an eighteenth aspect of the invention).

This arrangement makes it possible to generate, for each leg link, the restoring force on the basis of the ratio of a treading force of the leg of the user on the appropriate leg link relative to the total sum of a treading force of the left leg and a treading force of the right leg of a user, as with the ninth aspect of the invention. Thus, the restoring force can be produced to enhance the stability of a posture of the walking assist apparatus without adding to a load on a leg of the user.

Preferably, in the thirteenth aspect of the invention, the walking assist apparatus is provided with a selector switch for indicating whether to carry out lifting force control, wherein the processing for determining the total desired lifting force is the processing in which, if the selector switch is in an operation state indicating that the lifting force control should be carried out, then the total sum of a set value of the desired lifting force and a supporting force for supporting on a floor the weight obtained by subtracting the total weight of the portions below the second force sensors of the walking assist apparatus from the weight of the entire walking assist apparatus or the total sum of the desired lifting force and a supporting force for supporting the weight of the entire walking assist apparatus on a floor is determined as a total desired lifting force, and if the selector switch is in an operation state indicating that the lifting force control should not be carried out, then the total sum of the measured forces-to-be-controlled of both leg links is determined as the total desired lifting force (a nineteenth aspect of the invention).

Preferably, in the thirteenth aspect of the invention, the walking assist apparatus includes a displacement amount sensor for generating an output based on a displacement amount of the second joint and a selector switch for indicating whether or not to carry out the lifting force control, wherein, as with the seventeenth aspect of the invention, if the computer is made to carry out the processing for capturing an output of the displacement amount sensor, measuring the displacement amount of each second joint on the basis of the output and determining the deviation of the interval between the third joint and the seat from a predetermined reference value on the basis of the measured displacement amount of the second joint of each leg link, and another processing for correcting the desired share of each leg link such that the determined deviation approximates zero, then the processing for determining a total desired lifting force is composed of the processing in which, if the selector switch is in an operation state indicating that lifting force control should be conducted, then the total sum of a set value of the desired lifting force and the supporting force for supporting on a floor the weight obtained by subtracting the total weight of the portions below the second force sensors of the walking assist apparatus from the weight of the entire walking assist apparatus or the total sum of the desired lifting force and a supporting force for supporting the weight of the entire walking assist apparatus on a floor is determined as a total desired lifting force, or if the selector switch is in an operation state indicating that the lifting force control should not be conducted, then a value obtained by subtracting the correction amount of a desired share of each of both leg links supplied by the processing for correcting the desired share from the total sum of the measured forces-to-be-controlled of both leg links is determined as the total desired lifting force (a twentieth aspect of the invention).

According to the nineteenth and the twentieth aspects of the invention, as with the aforesaid tenth and the eleventh aspects of the invention, if the selector switch is in the operation state indicating that the lifting force control should not be conducted, then it will be basically a balanced state in which no force acts between a user and the seat. In other words, it is possible to maintain a state wherein the seat is in contact with a user while preventing a lifting force from being applied to the user from the seat. This enables the user to easily sit on the seat. In this state, if the selector switch is changed to the operation state indicating that lifting force control should be conducted, then the desired lifting force acts on the user from the seat. Thus, smooth switching between the mode in which a lifting force acts on a user and the mode in which no lifting force acts on the user can be accomplished.

In the nineteenth aspect of the invention, the technical constructions of the fourteenth to the eighteenth aspects of the invention described above may be combined. In the twentieth aspect of the invention, the technical constructions of the fourteenth to the sixteenth aspects of the invention may be combined. Further, in the twentieth aspect of the invention, the processing for correcting the desired share of each leg link is preferably constructed as in the eighteenth aspect of the invention, to be more specific.

Supplementally, in the first to the twentieth aspects of the invention explained above, the seat may be formed of, for example, a part (e.g., a saddle-like part) over which a user rides and sits thereon (the user sits on the seat, the seat being positioned at the proximal ends of both legs of the user). In this case, the first joint of each leg link is preferably provided under the seat. The first joint of each leg link is preferably a joint having a degree of freedom of rotation about at least two axes so that each leg link may perform, for example, adduction/abduction motions and longitudinal swing motions. The second joint of each leg link may be a joint having a degree of freedom of rotation about, for example, one lateral axis, or a translatory joint. The third joint of each leg link is preferably a joint having a degree of freedom for rotation about three axes.

DESCRIPTION OF THE PREFERRED EMBODIMENTS

A first embodiment of the present invention will be explained with reference to the accompanying drawings.

Figure 1:
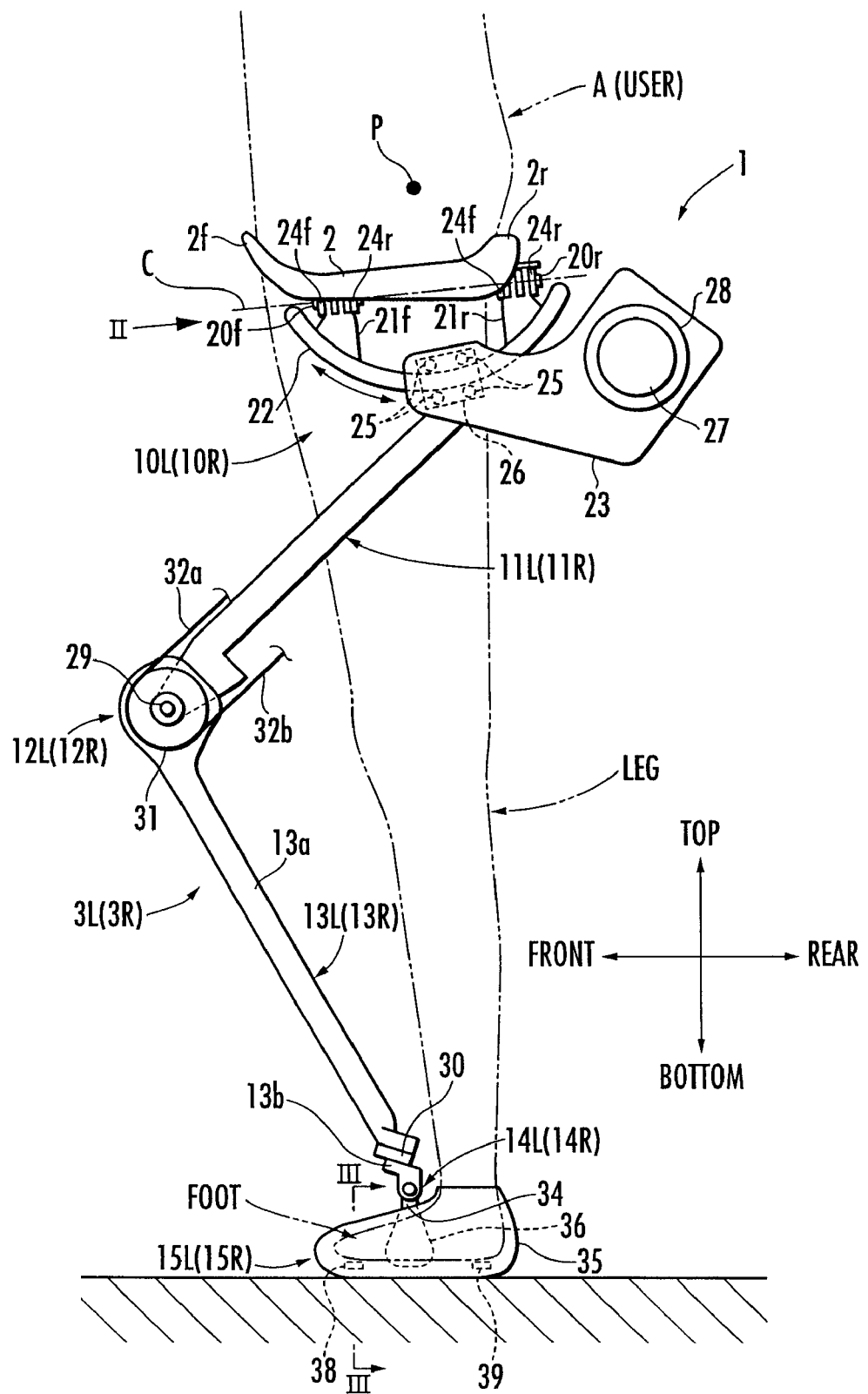
FIG. 1 is a side view (a view observed in a sagittal plane) of a walking assist apparatus to which a first embodiment of the present invention has been applied.
Figure 2:
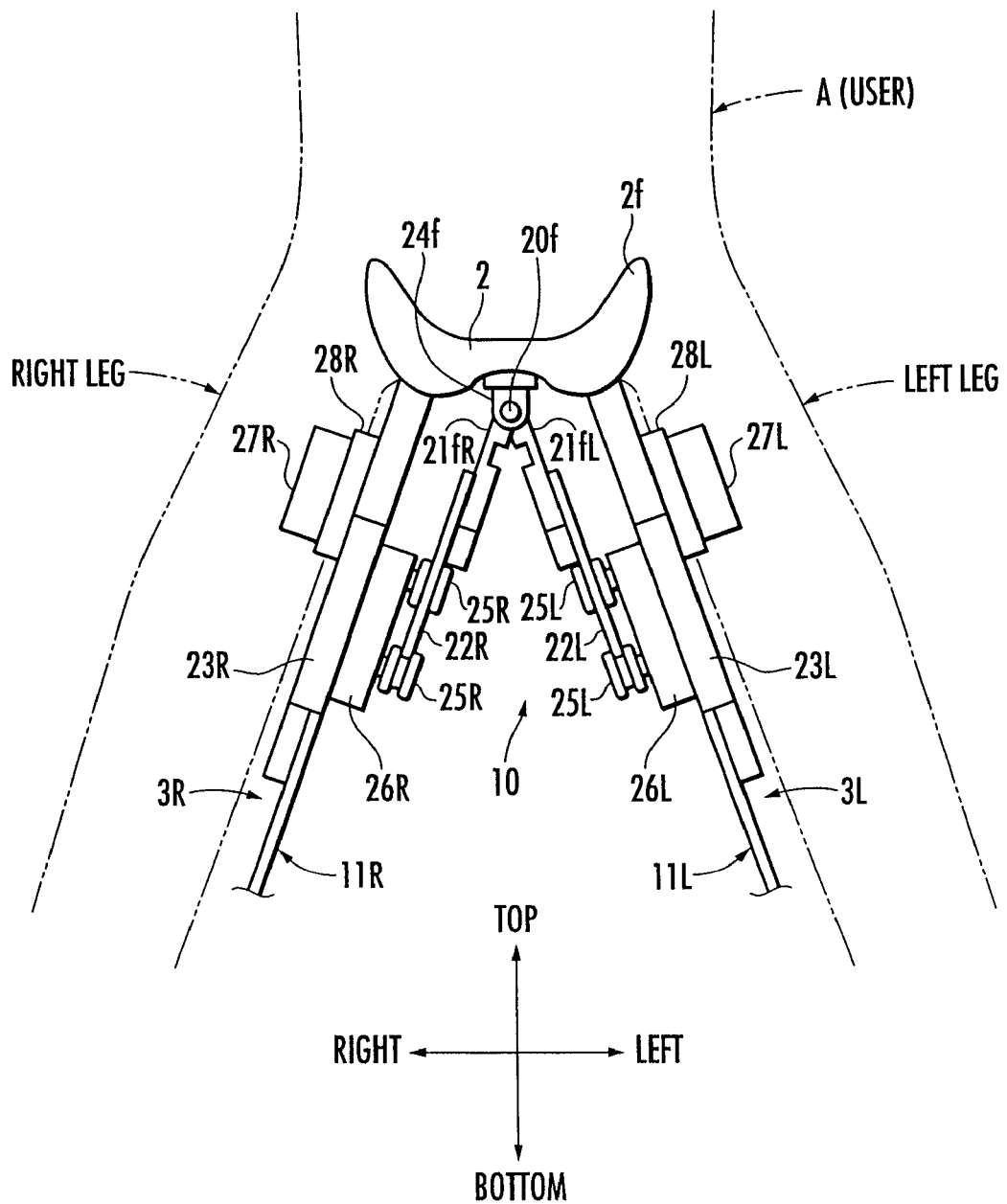
FIG. 2 is a sagittal view taken at II in FIG. 1.
Figure 3:
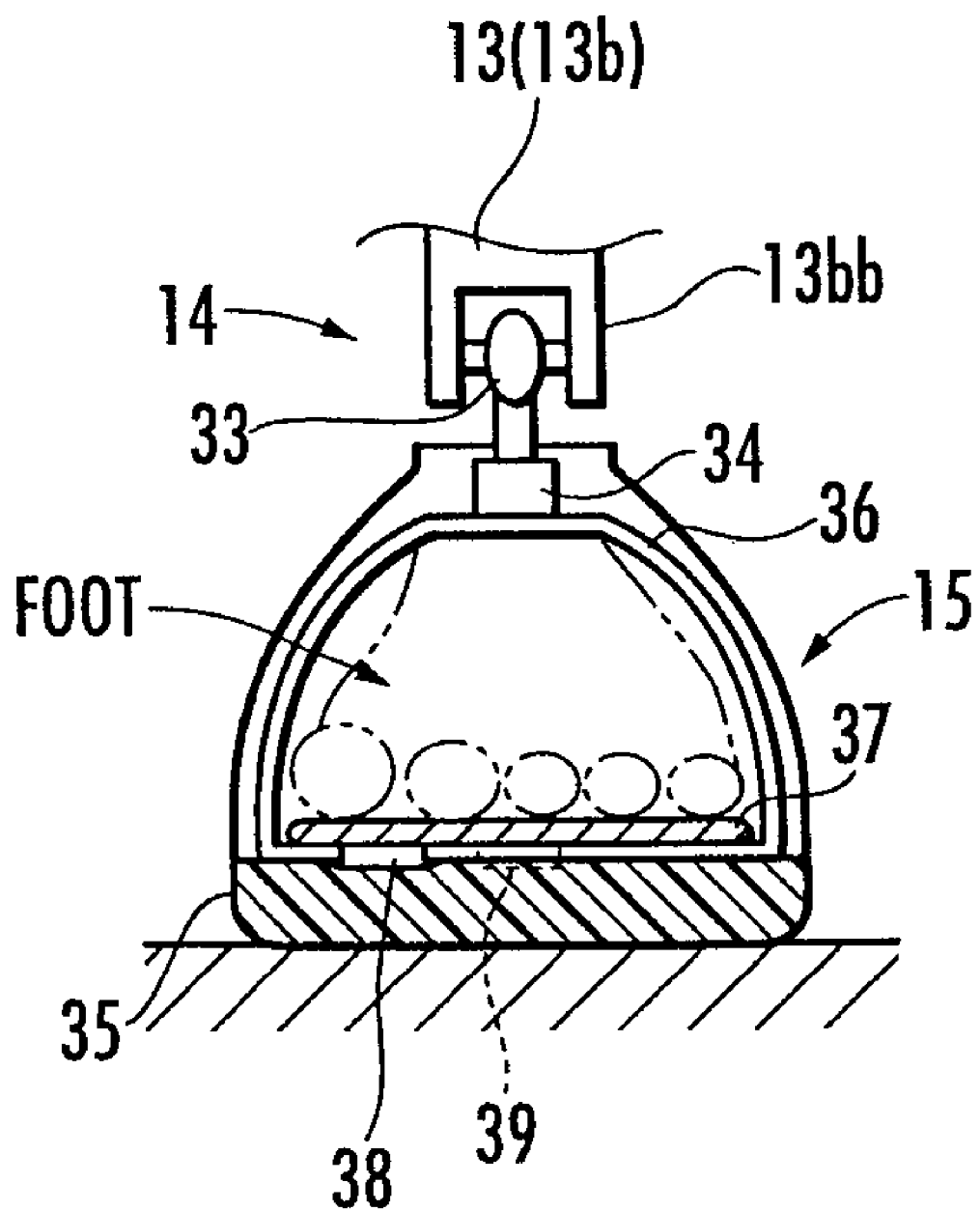
FIG. 3 is a section view taken at III-III in FIG. 1.

First, referring to FIG. 1 to FIG. 3, the construction of a walking assist apparatus according to the present embodiment will be explained. FIG. 1 to FIG. 3 show a walking assist apparatus 1 attached to a user A (indicated by a virtual line) and in operation. In this case, the user A in the figure is standing substantially upright. In FIG. 2, however, the user A is at a posture in which his/her both legs are open to the right and left in order to permit easier understanding of the structure of the walking assist apparatus 1.

Referring to FIG. 1 and FIG. 2, the walking assist apparatus 1 is a weight bearing assist system for supporting a part of the weight of the user A (for making the weight supported by the legs (standing legs) of the user lighter than the weight of himself/herself). The walking assist apparatus 1 includes a seat 2 on which the user A sits and a pair of right and left leg links 3R and 3L connected to the seat 2. The leg links 3R and 3L share the same structure. In FIG. 1, the leg links 3R and 3L are in the same posture and arranged in the lateral direction (in the direction perpendicular to the paper surface of FIG. 1) of the user A, and they overlap on the drawing in this state (the leg link 3L on the left is positioned on the front side of the figure).

In the explanation of the embodiments in the present description, a character "R" will be used to mean the relation to the right leg of the user A or a leg link 3R on the right side of the walking assist apparatus 1, and a character "L" will be used to mean the relation to the left leg of the user A or a leg link 3L on the left side of the walking assist apparatus 1. If, however, there is no need to particularly distinguish between right and left, then the characters R and L will be frequently omitted.

The seat 2 is a saddle-shaped member that enables the user A to stride over the seat 2 (with the seat 2 positioned at the proximal ends of both legs of the user A) and sit on the upper surface (seating surface) of the seat 2. When the user A is seated as described above, a part of the weight of the user A is imparted to the seat 2 from above.

As shown in FIG. 1, a front end 2f and a rear end 2r of the seat 2 protrude upward, as shown in FIG. 1. This arrangement restricts a seating position (a longitudinal position) of the user A relative to the seat 2 between the front end 2f and the rear end 2r of the seat 2. The front end 2f of the seat 2 has a bifurcated shape, as shown in FIG. 2.

Each leg link 3 has a thigh frame 11 connected to the bottom of the seat 2 through the intermediary of a first joint 10, a crus frame 13 connected to the thigh frame 11 through the intermediary of a second joint 12, and a foot-worn assembly 15 connected to the crus frame 13 through the intermediary of a third joint 14.

The first joint 10 of each leg link 3 is a joint corresponding to a hip joint of the user A and it permits a rocking motion of the leg link 3 about a lateral axis (a longitudinal swinging motion of the leg link 3) and a rocking motion thereof about a longitudinal axis (adduction/abduction motions). The first joint 10 is located below the seat 2. The first joint 10 includes a pair of shaft pins 20f and 20r that are disposed at a location adjacent to the front and at the rear end location of the bottom surface of the seat 2 and coaxially disposed on a longitudinal axis C indicated by a dashed line in FIG. 1, brackets 21f and 21r rotatively supported by the shaft pins 20f and 20r, respectively, an arc-shaped guide rail 22 fixed to the bottom ends of the brackets 21f and 21r, and a plate 23 movably supported along the guide rail 22 by the guide rail 22. The thigh frame 11 is extended from the plate 23 aslant forward and downward. The thigh frame 11 is an approximately rod-shaped member made integrally with the plate 23.

Both ends (front and rear ends) of each of the shaft pins 20f and 20r are fixed to the seat 2 through the intermediary of bearings 24f and 24r secured to the bottom surface of the seat 2. The upper end of the bracket 21f is supported by the shaft pin 20f by being fitted in the outer periphery of the middle portion of the shaft pin 20f. This allows the bracket 21f to freely rotate about the axis C of the shaft pin 20f. Similarly, the upper end of the bracket 21r is supported by the shaft pin 20r by being fitted in the outer periphery of the middle portion of the shaft pin 20r. This allows the bracket 21r to freely rotate about the axis C of the shaft pin 20r. Thus, the guide rail 22 of each first joint 10 swings together with the brackets 21f and 21r, using the axis C of the shaft pins 20f and 20r as the rotational axis. In the present embodiment, the first joints 10R and 10L of the leg links 3R and 3L, respectively, share the same rotational axis C, the shaft pins 20f and 20r being shared by the first joint 10R of the leg link 3R and the first joint 10L of the leg link 3L. More specifically, a bracket 21fR of the right first joint 10R and a bracket 21fL of the left first joint 10L are supported by the same shaft pin 20f. Similarly, a bracket 21rR of the right first joint 10R and a bracket 21rL of the left first joint 10L are supported by the same shaft pin 20r.

The plate 23 of the first joint 10 of each leg link 3 is disposed adjacently to the guide rail 22 and oriented in parallel to a plane including the arc of the guide rail 22. A carrier 26 having a plurality of (e.g., four) rotative rollers 25 is secured to the plate 23, as shown in FIG. 1. The same number of the rollers 25 of the carrier 26 engages with the upper surface (inner peripheral surface) and the lower surface (outer peripheral surface), respectively, of the guide rail 22 in such a manner that they are free to roll. This allows the plate 23 to freely move along the guide rail 22. In this case, the positional relationship between the guide rail 22 and the seat 2 and the radius of the arc of the guide rail 22 are set such that a central point P of the arc of the guide rail 22 is located above the seat 2 when the walking assist apparatus 1 is observed in a sagittal plane, as shown in FIG. 1.

The construction of the first joint 10 explained above allows the thigh frame 11 made integral with the plate 23 to swing about the longitudinal rotational axis C of the user A. This swing motion permits the adduction/abduction motions of each of the leg links 3. The thigh frame 11 made integral with the plate 23 is free to swing about the lateral axis passing the central point P (more accurately, about the axis that is perpendicular to a plane including the arc of the guide rail 22 and that passes the central point P). This swing motion allows the leg links 3 to swing back and forth. In the present embodiment, the first joint 10 is a joint that permits rotational motions about two axes, one axis in the longitudinal direction and the other axis in the lateral direction. Alternatively, however, the first joint may be constructed such that it permits rotational motions about a vertical axis, i.e., inward and outward turning motions of the leg links 3, in addition to the rotational motions about the two axes, namely, the longitudinal and the lateral axes. In other words, the first joint may be constructed such that it is capable of rotating about three axes. Alternatively, the first joint may be a joint that permits only the rotational motions about one axis in a lateral direction, i.e., a joint that allows each of the leg links 3 to swing back and forth only.

The plate 23 of the first joint 10 of each leg link 3 extends from the location of the carrier 26 toward the rear of the seat 2 when the walking assist apparatus 1 is observed in the sagittal plane, as shown in FIG. 1. At the rear end of the plate 23, an electric motor 27 and a rotary encoder 28 serving as a rotational angle detector for detecting a rotational angle (a rotational angle from a predetermined reference position) of the rotor of the electric motor 27 are coaxially installed. In the present embodiment, the second joint 12 among the first to the third joints 10, 12, and 14, respectively, of each leg link 3 is driven. The electric motor 27 is an actuator that drives the second joint 12. A rotational angle detected by the rotary encoder 28 is used for measuring a rotational angle (a bend angle) of the second joint 12. An electric motor 27L of the left leg link 3L and an electric motor 27R of the right leg link 3R correspond to the actuator for the left and the actuator for the right, respectively, in the present invention. Each rotary encoder 28 corresponds to the displacement amount sensor in the present invention. Each actuator may be a hydraulic or pneumatic actuator. Further, each actuator may be fixed to, for example, the rear portion of the seat 2 through the intermediary of an appropriate bracket. Alternatively, each actuator may be attached to the second joint 12 of each leg link 3 to directly drive the second joint 12. The displacement amount sensor may be directly attached to the second joint 12 of each leg link 3. Further alternatively, the displacement amount sensor may be composed of a potentiometer or the like in place of a rotary encoder.

The second joint 12 of each leg link 3 is a joint that corresponds to a knee joint of the user A and enables the leg link 3 to bend and stretch. The second joint 12 connects the lower end of the thigh frame 11 and the upper end of the crus frame 13 through the intermediary of a shaft pin 29 having an axis in the lateral direction (more accurately, an axis in the direction perpendicular to a plane that includes the arc of the guide rail 22). The second joint 12 allows the crus frame 13 to freely and relatively rotate about the axis of the shaft pin 29 with respect to the thigh frame 11. The second joint 12 is provided with a stopper, not shown, for restricting the range in which the crus frame 13 can rotate relative to the thigh frame 11.

The crus frame 13 of each leg link 3 is an approximately rod-shaped member extending aslant downward from the second joint 12 of the leg link 3. More specifically, the crus frame 13 is formed by connecting a lower crus frame 13b, which constitutes a portion adjacent to the third joint 14, and a rod-shaped upper crus frame 13a, which constitutes a portion above the lower crus frame 13b, through the intermediary of a force sensor 30 (corresponding to the second force sensor in the present invention) located therebetween. The lower crus frame 13b is sufficiently shorter than the upper crus frame 13a. Thus, the force sensor 30 is disposed adjacently to the third joint 14. The force sensor 30 is a force sensor called "Kistler Sensor" (registered trademark). More specifically, the force sensor 30 is a three-axis force sensor for detecting the translational forces of three axes, namely, a translational force in the axial direction perpendicular to the surface of the force sensor 30 and the translational forces in two axial directions that are parallel to the surface of the force sensor 30 and that are orthogonal to each other. In the present embodiment, however, only the detection values of the translational forces of two axes out of the translational forces of three axes that are detected are used. Therefore, the force sensor 30 may be composed of a two-axis force sensor adapted to detect translational forces of two axes.

A pulley 31 that is rotatively integral with the crus frame 13 about the shaft pin 29 of the second joint 12 is secured to the upper end of the upper crus frame 13a of the crus frame 13. The ends of a pair of wires 32a and 32b serving as a driving force transmitting means for transmitting a rotational driving force of the electric motor 27 to the pulley 31 are secured to the outer periphery of the pulley 31. These wires 32a and 32b are drawn out in the tangential direction of the pulley 31 from two places opposing the diameter of the outer periphery of the pulley 31. The wires 32a and 32b are run through a rubber hose (not shown) for protecting the wires, which is laid along the thigh frame 11, and connected to a rotational drive shaft (not shown) of the electric motor 27. In this case, the electric motor 27 applies tensions to these wires 32a and 32b such that one of the wires 32a and 32b is rewound by the pulley 31, while the other is drawn out of the pulley 31 when the rotational drive shaft of the electric motor 27 rotates in the forward direction, and one of the wires 32a and 32b is rewound by the pulley 31, while the other is drawn out of the pulley 31 when the rotational drive shaft of the electric motor 27 rotates in the reverse direction. Thus, the rotational driving force of the electric motor 27 is transmitted to the pulley 31 through the intermediary of the wires 32a and 32b so as to rotationally drive the pulley 31. In other words, the crus frame 13 to which the pulley 31 is secured rotates about the axis of the shaft pin 29 of the second joint 12 relative to the thigh frame 11.

The bottom end of the lower crus frame 13b of the crus frame 13 has a bifurcated tip 13bb formed to have a bifurcated shape, as shown in FIG. 3.

The third joint 14 of each leg link 3 is a joint corresponding to an ankle joint of the user A. The third joint 14 is composed of a free joint 33 (see FIG. 3) that permits rotations about three axes, as shown in FIG. 3. The free joint 33 is attached to the bifurcated tip 13bb of the lower crus frame 13b of the crus frame 13 to connect the lower end, namely, the bifurcated tip 13bb, of the crus frame 13 and a connection 34 on the top of the foot-worn assembly 15. This enables the foot-worn assembly 15 to rotate with three degrees of freedom relative to the crus frame 13. The range of rotation of the foot-worn assembly 15 about a longitudinal axis is restricted by the bifurcated tip 13bb of the crus frame 13.

The foot-worn assembly 15 of each leg link 3 includes a shoe 35 into which a foot of the user A is to be placed and a stirrup-shaped annular member 36 housed in the shoe 35. The annular member 36 has its upper end secured to the connection 34. As shown in FIG. 3, the annular member 36 is housed in the shoe 35 such that the flat bottom plate thereof is abutted against the internal bottom surface of the shoe 35 and the curved portion thereof extending to both ends of the bottom plate is abutted against the side wall of the cross section of the shoe 35. Further, a sole insert member 37 made of a rigid plate (not shown in FIG. 1) is inserted in the shoe 35 such that it covers the internal bottom surface of the shoe 35 and the bottom plate of the annular member 36. The connection 34 is inserted in the shoe 35 through an opening for inserting a shoelace of the shoe 35.

To put the foot-worn assembly 15 of each leg link 3 on each foot of the user A, the foot of the user A is inserted in the shoe 35 from the top opening of the shoe 35 by passing the toe portion of the foot through the annular member 36 and by placing the sole insert member 37 on the bottom surface of the foot. Then, in this state, the shoelace is tightened up, thus putting the foot-worn assembly 15 on the foot.

On the bottom surface of the sole insert member 37 of the foot-worn assembly 15, force sensors 38 and 39 are installed at a location on the front side of the shoe 35 (a location farther to the front than the bottom plate of the annular member 36) and at a location on the rear side thereof (a location farther to the rear than the bottom plate of the annular member 36). The force sensor 38 on the front side is disposed such that it is substantially right below a metatarsophalangeal joint (MP joint) of the foot of the user A wearing the foot-worn assembly 15. The force sensor 39 on the rear side is disposed such that it is substantially right below the heel of the foot. In the present embodiment, these force sensors 38 and 39 are one-axis force sensors for detecting translational forces in a direction perpendicular to the bottom surface (ground contact surface) of the foot-worn assembly 15, that is, a direction substantially perpendicular to a floor surface in a state wherein a leg or legs of the user A are standing. Hereinafter, the force sensors 38 and 39 will be referred to as an MP sensor 38 and a heel sensor 39, respectively. The MP sensor 38 and the heel sensor 39 constitute the first force sensor in the present invention. The sole insert member 37 does not necessarily have to be a rigid plate; it may alternatively be formed of a flexible material. If the sole insert member 37 is formed of a flexible material, providing the bottom surface thereof with a plurality of first force sensors permits highly accurate detection of a force applied to each portion of the bottom surface of a foot of the user A. Meanwhile, if the sole insert member 37 is formed of a rigid plate, then a treading force of an entire foot of the user A can be easily detected. This makes it possible to reduce the number of first force sensors installed on the bottom surface of the sole insert member 37.

The above describes the construction of the walking assist apparatus 1 according to the present embodiment. Supplementally, in a state wherein the foot-worn assembly 15 has been attached to each foot of the user A and the user A sits on the seat 2 with the walking assist apparatus 1 in operation, that is, while the second joint 12 is being driven by the electric motor 27, as it will be discussed later, if the user A and the walking assist apparatus 1 are observed in a frontal plane, i.e., from the front side of the user A, the thigh frame 11L of the left leg link 3L, for example, extends along the inner surface of the left leg of the user A (see FIG. 2), and the second joint 12L at the bottom end of the thigh frame 11L is positioned on the inner side of the left leg. Although not shown, the upper portion of the crus frame 13L (the upper portion of the upper crus frame 13aL) connected to the second joint 12L extends along the inner surface of the left leg of the user A from the second joint 12L when observed in a frontal plane. The crus frame 13L is formed such that the lower portion of the crus frame 13L gradually curves and reaches a point right above the instep of the foot of the left leg in front of the shin of the left leg. The same applies to the right leg link 3R.

When the user A having a typical build stands up in an upright posture, the second joints 12 of the leg links 3 jut out toward the front beyond the legs of the user A, as shown in FIG. 1. More specifically, the lengths of the thigh frame 11 and the crus frame 13 are set such that the sum of the lengths is slightly greater than the dimension of the inseam of a leg of the user A having a typical build. The lengths of the thigh frame 11 and the crus frame 13 set as described above and the stopper of the second joint 12 described above restrain the occurrence of a singular point state in which the thigh frame 11 and the crus frame 13 are aligned or a state in which the thigh frame 11 and the crus frame 13 bend in the opposite direction from that shown in FIG. 1. This restrains the control of the walking assist apparatus 1 from failing due to the singular point state or the reverse bend state of the leg links 3.

The second joint of each leg link 3 may be a translatory joint.

Although the details will be discussed later, in the walking assist apparatus 1 constructed as described above, an upward lifting force is applied from the seat 2 to the user A by generating torques of the second joints 12 by the electric motors 27, with the foot-worn assemblies 15 being attached to the feet of the legs of the user A. At this time, if, for example, both legs of the user A are standing legs (the legs to support the weight of the user A), that is, in the so-called two-leg supporting period, then the foot-worn assemblies 15, 15 on both feet come in contact with a floor and floor reaction forces act on the respective ground contact surfaces. The floor reaction forces acting on the ground contact surfaces of the foot-worn assemblies 15 are such that the resultant force thereof is a force that balances out the sum of the gravity acting on the user A and the gravity acting on the walking assist apparatus 1, that is, the force for supporting the total weight of the user A and the walking assist apparatus 1 on a floor (the translational force, which will be hereinafter referred to as "the total supporting force"). More accurately, when the legs of the user A are in motions together with the leg links 3 of the walking assist apparatus 1, a force for supporting an inertial force generated by the motions of the user A and the walking assist apparatus 1 will be added to the total supporting force. However, in the walking assist apparatus 1 according to the present embodiment, the electric motors 27 (actuators) and the encoders 28 having large weights are disposed near the waist rather than in the vicinity of the knees of the leg links 3. Only the foot-worn assemblies 15 of the leg links 3 are restricted or worn by the user A, so that the number of members to be attached to the user A is smaller, making the leg links 3 lighter. Thus, an inertial force from a motion of the walking assist apparatus 1 remains sufficiently small.

In this case, in the walking assist apparatus 1 according to the present embodiment, only the two foot-worn assemblies 15 and 15 are restrained by being attached to the user A. Each foot-worn assembly 15 includes the annular link member 36. Therefore, the gravity acting on the walking assist apparatus 1 and the load received by the walking assist apparatus 1 from the user A (a downward translational force) through the intermediary of the seat 2 hardly act on the user A; instead, they act on a floor surface from the two leg links 3, 3 through the intermediary of the annular link members 36, 36 of the two foot-worn assemblies 15, 15, respectively.

Accordingly, both leg links 3, 3 of the walking assist apparatus 1 are subjected to a supporting force for supporting the gravity acting on the walking assist apparatus 1 and a load received by the walking assist apparatus 1 from the user A through the intermediary of the seat 2 out of the total supporting force. The supporting force is borne by the walking assist apparatus 1 through the intermediary of the two leg links 3, 3. Hereinafter, the supporting force borne by the walking assist apparatus 1 as described above will be referred to as "the borne-by-the-assist-apparatus supporting force." In other words, the borne-by-the-assist-apparatus supporting force is a supporting force for supporting the weight of the entire walking assist apparatus 1 and a weight corresponding to a load received by the seat 2 from the user A (a part of the weight of the user A). If both legs of the user A are standing, i.e., if both foot-worn assemblies 15 of the walking assist apparatus 1 are in contact with the ground, then the borne-by-the-assist-apparatus supporting force is dividedly borne by the two leg links 3, 3. More specifically, a part of the borne-by-the-assist-apparatus supporting force is borne by one leg link 3 and the rest thereof is borne by the other leg link 3. If only one leg of the user A is standing, i.e., if the other leg is free, then all the borne-by-the-assist-apparatus supporting force is borne by the standing leg link 3. Hereinafter, the supporting force borne by one of the leg links 3, i.e., the supporting force acting on one of the leg links 3, out of the borne-by-the-assist-apparatus supporting force will be referred to as "the borne-by-the-leg-link supporting force." Further, a supporting force borne by the right leg link 3 will be referred to as "the borne-by-the-right-leg-link supporting force" and a supporting force borne by the left leg link 3 will be referred to as "the borne-by-the-left-leg-link supporting force." The total sum of the borne-by-the-left-leg-link supporting force and the borne-by-the-right-leg-link supporting force coincides with the borne-by-the-assist-apparatus supporting force. Each borne-by-the-leg-link supporting force is transmitted to the crus frame 13 from the foot-worn assembly 15 through the intermediary of the third joint 14.

Meanwhile, a supporting force, which is obtained by subtracting the borne-by-the-assist-apparatus supporting force from the total supporting force, acts from the floor surface to both legs of the user A, and this supporting force is borne by the user A with his/her legs. Hereinafter, the supporting force borne by the user A will be referred to as "the borne-by-the-user supporting force." In other words, the borne-by-the-user supporting force is a supporting force for supporting the weight, which is obtained by subtracting a weight corresponding to a load to be applied by the user A to the seat 2 of the walking assist apparatus 1 from the weight of the user A, on a floor. If both legs of the user A are standing, then the borne-by-the-user supporting force is divided among and borne by both legs of the user A. This means that a part of the borne-by-the-user supporting force is borne by one leg and the rest thereof is borne by the other leg. If only one leg of the user A is standing, then all the borne-by-the-user supporting force is borne by the one leg. Hereinafter, the supporting force borne by each leg, i.e., the supporting force acting on each leg from a floor surface, out of the borne-by-user supporting force will be referred to as "the borne-by-user-leg supporting force." Further, a supporting force borne by the right leg will be referred to as "the borne-by-user-right-leg supporting force" and a supporting force borne by the left leg will be referred to as "the borne-by-user-left-leg supporting force." The total sum of the borne-by-user-left-leg supporting force and the borne-by-user-right-leg supporting force coincides with the borne-by-user supporting force. The force that the user A applies to push the foot of each leg against a floor surface to support himself/herself is referred to as a treading force of the leg. The treading force of each leg balances out the borne-by-user-leg supporting force.

Supplementally, the force sensor 30 provided in each leg link 3 is located on the third joint 14. Hence, the supporting force that is obtained by subtracting the supporting force for supporting the weight of the portion below the force sensor 30 (e.g., the foot-worn assembly 15) of the leg link 3 from the leg link supporting force related to the leg link 3 acts on the force sensor 30. Then, the components in three-axis directions or two-axis directions of the acting supporting force are detected by the force sensor 30. In other words, the force acting on each force sensor 30, which corresponds to the force to be controlled in the present invention, corresponds to the share of the leg link 3 provided with the force sensor 30 out of the total supporting force for supporting the weight, which is obtained by subtracting the total sum of the weights of the portions below the force sensors 30 from the weight of the entire walking assist apparatus 1, and the weight corresponding to a load imparted to the seat 2 from the user A. Further, the total sum of the supporting forces detected by the two force sensors 30 and 30, respectively, coincides with the total supporting force for supporting the weight, which is obtained by subtracting the total sum of the weights of the portions below the force sensors 30 from the weight of the entire walking assist apparatus 1, and the weight corresponding to a load imparted to the seat 2 from the user A (hereinafter, the force sensors 30 will be referred to as "the supporting force sensors 30"). The total sum of the weights of the portions below the supporting force sensors 30 of the walking assist apparatus 1 is sufficiently small, as compared with the weight of the entire walking assist apparatus 1. Hence, the supporting force acting on each of the supporting force sensors 30 is substantially equal to the leg link supporting force. Further, each supporting force sensor 30 is provided adjacently to the third joint 14 of the leg link 3 provided with the same. Hence, a supporting force acting on the supporting force sensor 30 is substantially equal to a translational force acting on the crus frame 13 from the third joint 14 of the leg link 3 or to the supporting force out of the leg link supporting force that is transmitted from a floor to the crus frame 13 through the intermediary of the third joint 14. Hereinafter, the total sum related to both leg links 3 and 3, that is, the total sum of the supporting forces acting on the supporting force sensors 30 or the translational forces acting on the crus frames 13 from the third joints 14 of the leg links 3 will be referred to as "the total lifting force." Of the total lifting force, the share of each leg link 3 will be referred to as "the total lifting force share."

The total sum of the forces acting on the MP sensor 38L and the heel sensor 39L of the left foot-worn assembly 15L corresponds to the aforesaid borne-by-user-left-leg supporting force or the treading force of the left leg. Similarly, the total sum of the forces acting on the MP sensor 38R and the heel sensor 39R of the right foot-worn assembly 15R corresponds to the aforesaid borne-by-user-right-leg supporting force or the treading force of the right leg. In the present embodiment, the MP sensor 38 and the heel sensor 39 use one-axis force sensors; however, they may alternatively use, for example, two-axis force sensors that detect also translational forces in directions substantially parallel to the bottom surface of the shoe 33, or they may use three-axis force sensors. The MP sensor 38 and the heel sensor 39 desirably use sensors capable of detecting translational forces in directions substantially perpendicular at least to the sole of the shoe 33 or a floor surface.

The control device of the walking assist apparatus 1 constructed as described above will now be explained.

Figure 4:
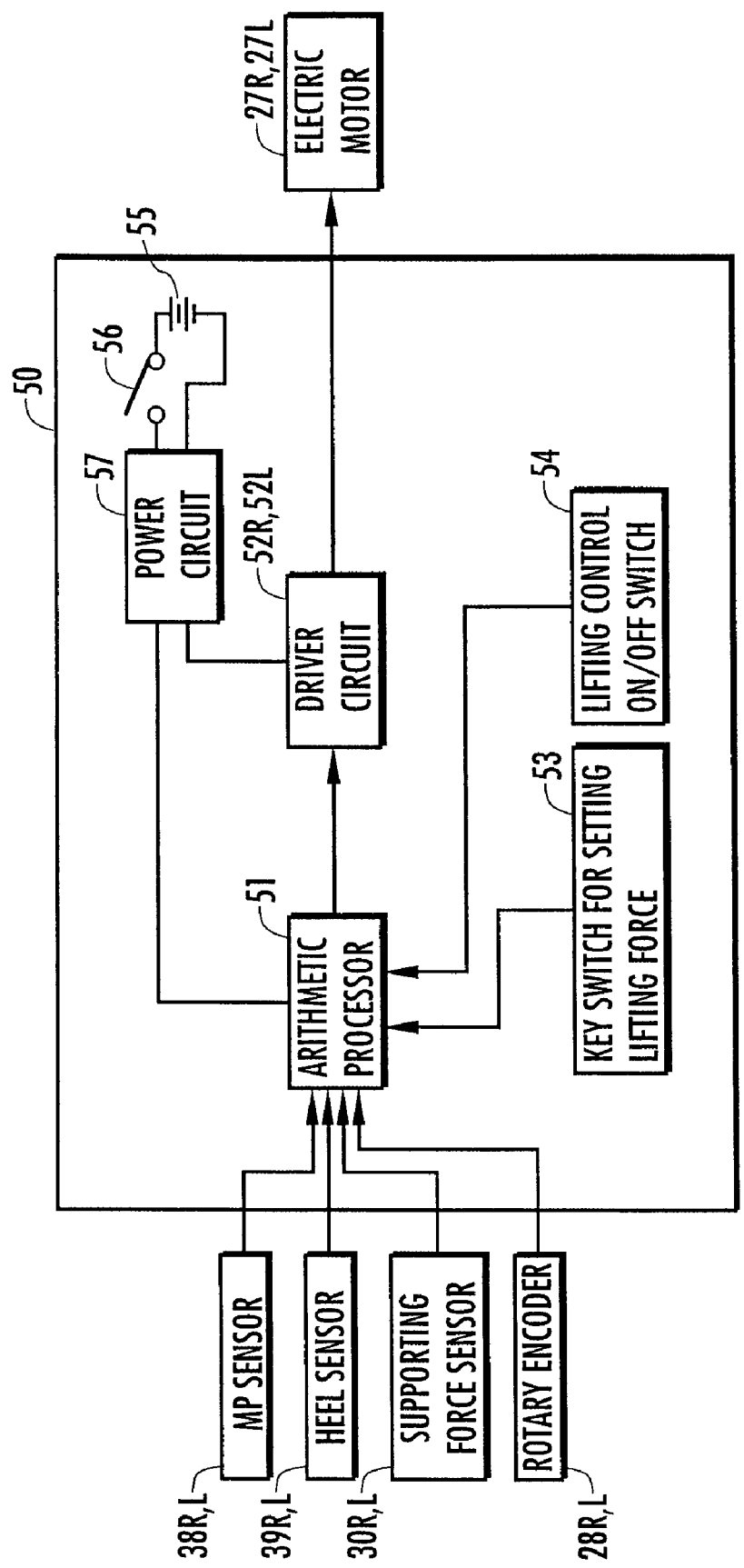
FIG. 4 is a block diagram schematically showing the construction (hardware construction) of a control device of the walking assist apparatus shown in FIG. 1.

FIG. 4 is a block diagram schematically showing the configuration (hardware configuration) of the control device 50. As shown in the figure, the control device 50 includes an arithmetic processor 51 composed of a microcomputer incorporating a CPU, a RAM, and a ROM, and an input/output circuit including an A/D converter, driver circuits 52R and 52L for the electric motors 27R and 27L, respectively, a lifting force setting key switch 53 for setting a desired value of the magnitude of a lifting force for the user A by the walking assist apparatus 1 (an upward translational force to be applied to the user A from the seat 2), a lifting control ON/OFF switch 54 for selecting whether or not to generate a lifting force for the user A, a power battery 55, and a power circuit 57 that is connected to the power battery 55 through the intermediary of a power switch 56 (ON/OFF switch) and supplies power from the power battery 55 to the circuits of 51, 52R and 52L of the control device 50 when the power switch 56 is turned ON or closed. The lifting force setting key switch 53 corresponds to the desired lifting force setting means in the present invention, and the lifting control ON/OFF switch 54 corresponds to the selector switch in the present invention.

The control device 50 is secured to the rear end of the seat 2 or the plate 23R or 23L or the like through the intermediary of a bracket (not shown). The lifting force setting key switch 53, the lifting control ON/OFF switch 54, and the power switch 56 are mounted on the outer surface of the housing (not shown) of the control device 50 so that they are accessible for control. The lifting force setting key switch 53 is formed of a ten-key switch or a plurality of selector switches to permit direct setting of a desired value of a lifting force or selective setting from among a plurality of types of desired values prepared beforehand.

Connected to the control device 50 are the MP sensors 38R, 38L, the heel sensors 39R, 39L, the supporting force sensors 30R, 30L, and the rotary encoders 28R, 28L via connection lines (not shown). The output signals of these sensors are supplied to the arithmetic processor 51. The arithmetic processor 51 receives control signals of the lifting force setting key switch 53 and the lifting control ON/OFF switch 54 and signals indicating the operation statuses of the switches. Further, the control device 50 is connected to the electric motors 27R, 27L via connection lines (not shown) to supply current to the electric motors 27R and 27L from the driver circuits 52R, 52L. The arithmetic processor 51 determines the command values of current (hereinafter referred to as "the indicator current values") for energizing the electric motors 27R, 27L by arithmetic processing or control processing to be described later. The arithmetic processor 51 controls the driver circuits 52R, 52L on the basis of the indicator current values so as to control the produced torques of the electric motors 27R, 27L.

Output signals, namely, voltage signals, of the MP sensors 38R, 38L, the heel sensors 39R, 39L, and the supporting force sensors 30R, 30L may be amplified by a preamplifier in the vicinity of these sensors and input to the control device 50. The voltage values of the amplified output signals of the MP sensors 38R, 38L, the heel sensors 39R, 39L, and the supporting force sensors 30R, 30L are subjected to A/D conversion before the amplified output signals are supplied to the arithmetic processor 51.

Figure 5:
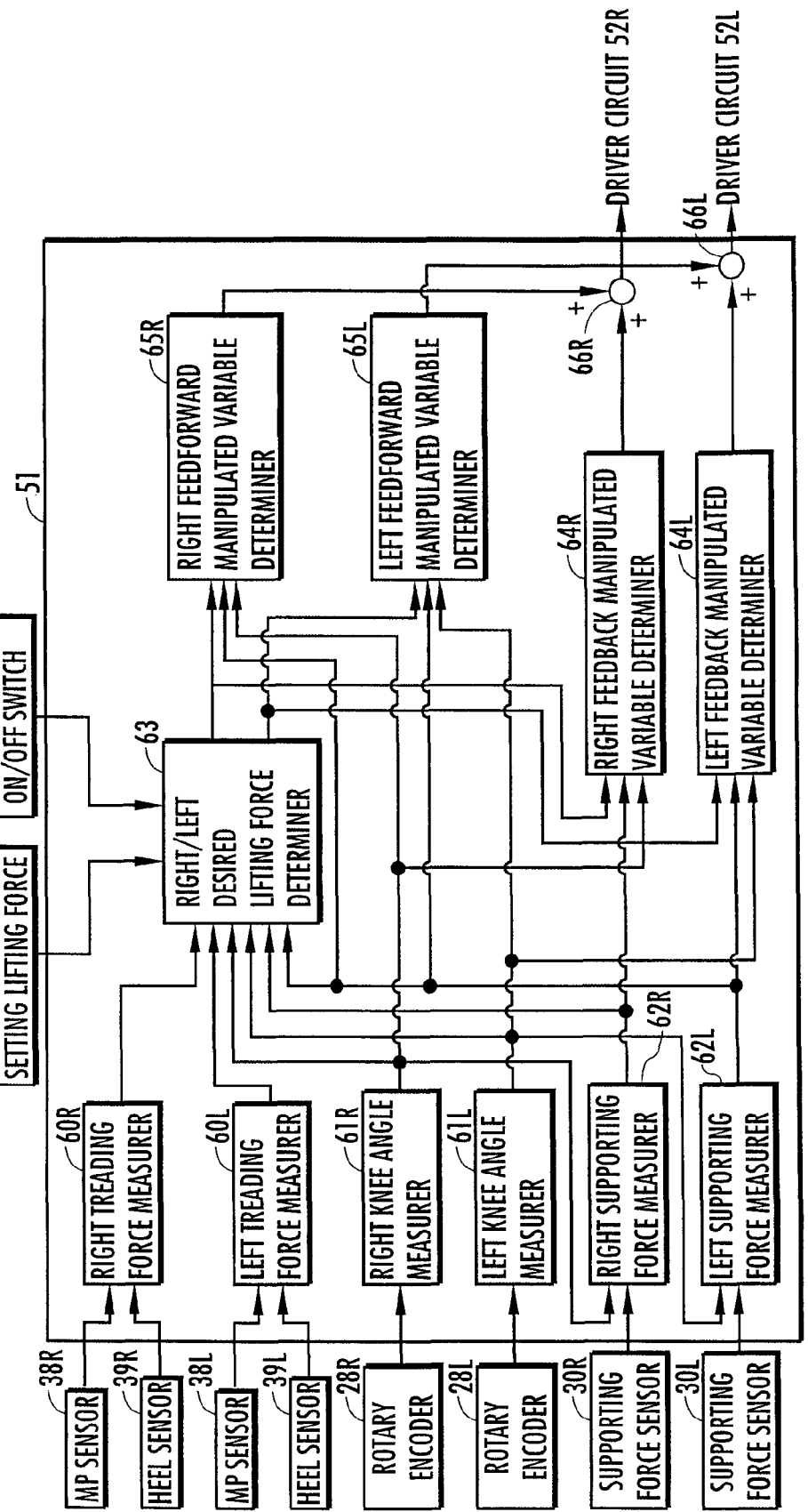
FIG. 5 is a block diagram showing the functional construction of an arithmetic processor 51 provided in the control device shown in FIG. 4.

The arithmetic processor 51 has a functional means shown in the block diagram of FIG. 5 as its main functional means. The functional means is a function implemented by a program stored in the ROM.

Referring to FIG. 5, the arithmetic processor 51 has a right treading force measuring processor 60R to which output signals of the MP sensor 38R and the heel sensor 39R of the right leg link 3R are supplied and a left treading force measurer 60L to which output signals of the MP sensor 38L and the heel sensor 39L of the left leg link 3L are supplied. The right treading force measurer 60R is a means for carrying out the processing for measuring the magnitude of a treading force of the right leg of the user A, i.e., the magnitude of the borne-by-user-right-leg supporting force, from the voltage values of output signals of the MP sensor 38R and the heel sensor 39R. Similarly, the left treading force measurer 60L is a means for carrying out the processing for measuring the magnitude of a treading force of the left leg of the user A, i.e., the magnitude of the borne-by-user-left-leg supporting force, from the voltage values of output signals of the MP sensor 38L and the heel sensor 39L. The treading force measurers 60R and 60L correspond to the treading force measuring means in the present invention.

The arithmetic processor 51 includes a right knee angle measurer 61R and a left knee angle measurer 61L to which output signals (pulse signals) of the rotary encoders 28R and 28L are supplied. These knee angle measurers 61R and 61L are means for measuring the bending angles in the second joints 12 (the displacement amounts of the second joints 12) of the leg links 3 associated therewith. The second joint 12 of each leg link 3 corresponds to the knee joint of the leg link 3, so that the bending angle in the second joint will be hereinafter referred to as the knee angle. These knee angle measurers 61R and 61L correspond to the joint displacement amount measuring means in the present invention.

The arithmetic processor 51 also includes a right supporting force measurer 62R to which output signals of the supporting force sensor 30R of the right leg link 3R and knee angles of the right leg link 3R measured by the right knee angle measurer 61R are supplied, and a left supporting force measurer 62L to which output signals (output voltages) of the supporting force sensor 30L of the left leg link 3L and knee angles of the left leg link 3L measured by the left knee angle measurer 61L are supplied. The right supporting force measurer 62R is a means that carries out the processing for measuring the supporting force acting on the supporting force sensor 30R out of the right leg link supporting force, i.e., the total lifting force share of the right leg link 3R, on the basis of a received output signal of the supporting force sensor 30R and a measurement value of a knee angle of the right leg link 3R. Similarly, the left supporting force measurer 62L is a means that carries out the processing for measuring the supporting force acting on the supporting force sensor 30L out of the left leg link supporting force, i.e., the total lifting force share of the left leg link 3L, on the basis of a received output signal of the supporting force sensor 30L and a measurement value of a knee angle of the left leg link 3L. These supporting force measurers 62R and 62L correspond to the force-to-be-controlled measuring means in the present invention.

The arithmetic processor 51 includes a right/left desired lifting force determiner 63, which receives the measurement values of the measurers 60R, 60L, 61R, 60L, 62R, and 62L and the control signals of the lifting force setting key switch 53 and the lifting control ON/OFF switch 54. The right/left desired lifting force determiner 63 is a means that carries out processing for determining a desired total lifting force, which is a desired value of the total lifting force, and also for determining the desired value of a share of each leg link 3 relative to the desired total lifting force, i.e., the desired value of the total lifting force share of each leg link 3 (hereinafter referred to simply as "a control desired value"). The control desired value corresponds to a desired share in the present invention.

The arithmetic processor 51 includes a right feedback manipulated variable determiner 64R that receives a total lifting force share of the right leg link 3R measured by the right supporting force measurer 62R, a control desired value of the right leg link 3R determined by the right/left desired lifting force determiner 63, and a knee angle of the right leg link 3R measured by the right knee angle measurer 61R, a left feedback manipulated variable determiner 64L that receives a total lifting force share of the left leg link 3L measured by the left supporting force measurer 62L, a control desired value of the left leg link 3L determined by the right/left desired lifting force determiner 63, and a knee angle of the left leg link 3L measured by the left knee angle measurer 61L, a right feedforward manipulated variable determiner 65R that receives the total lifting force share of the right leg link 3R measured by the right supporting force measurer 62R, the control desired value of the right leg link 3R determined by the right/left desired lifting force determiner 63, and the knee angle of the right leg link 3R measured by the right knee angle measurer 61R, and a left feedforward manipulated variable determiner 65L that receives the total lifting force share of the left leg link 3L measured by the left supporting force measurer 62L, the control desired value of the left leg link 3L determined by the right/left desired lifting force determiner 63, and the knee angle of the left leg link 3L measured by the left knee angle measurer 61L. Each of the feedback manipulated variable determiners 64 is a means for calculating, according to a predetermined feedback control law, a feedback manipulated variable (more specifically, the feedback component of the indicator current value relative to each electric motor 27) on the basis of a difference between a measurement value of an input total lifting force share and a control desired value such that the difference converges to zero. The feedforward manipulated variable determiner 65 is a means for calculating, according to a predetermined feedforward control law, a feedforward manipulated variable (more specifically, the feedforward component of the indicator current value relative to each electric motor 27) for adjusting the measurement value of the total lifting force share to a control desired value on the basis of an input measurement value of a total lifting force share, a control desired value, and a measurement value of a knee angle.

The arithmetic processor 51 includes an adder 66R for determining an indicator current value for the electric motor 27R of the right leg link 3R by adding a feedback manipulated variable calculated by the right feedback manipulated variable determiner 64R and a feedforward manipulated variable calculated by the right feedforward manipulated variable determiner 65R, and an adder 66L for determining an indicator current value for the electric motor 27L of the left leg link 3L by adding a feedback manipulated variable calculated by the left feedback manipulated variable determiner 64L and a feedforward manipulated variable calculated by the left feedforward manipulated variable determiner 65L.

The feedback manipulated variable determiners 64R, 64L, the feedforward manipulated variable determiners 65R, 65L, and the adders 66R, 66L described above correspond to the actuator controlling means in the present invention.

The above is the overview of the arithmetic processing function of the arithmetic processor 51.

The control processing of the control device 50 according to the present embodiment will now be explained. This will include detailed explanation of the processing of the arithmetic processor 51. In the walking assist apparatus 1 according to the present embodiment, if the power switch 56 is OFF, no driving force will be imparted to the second joints 12 of the leg links 3, allowing the joints 10, 12 and 14 to freely move. In this state, the leg links 3 are folded by their own weights. In this state, each foot-worn assembly 15 is attached to each foot of the user A, then the user A or an attendant lifts the seat 2 and positions it under his/her crotch.

Subsequently, when the power switch 56 is turned ON, power is supplied to the circuits of the control device 50, thus activating the control device 50. As the control device 50 is activated, the arithmetic processor 51 carries out the processing, which is explained below, at predetermined control processing cycles.

Figure 6:
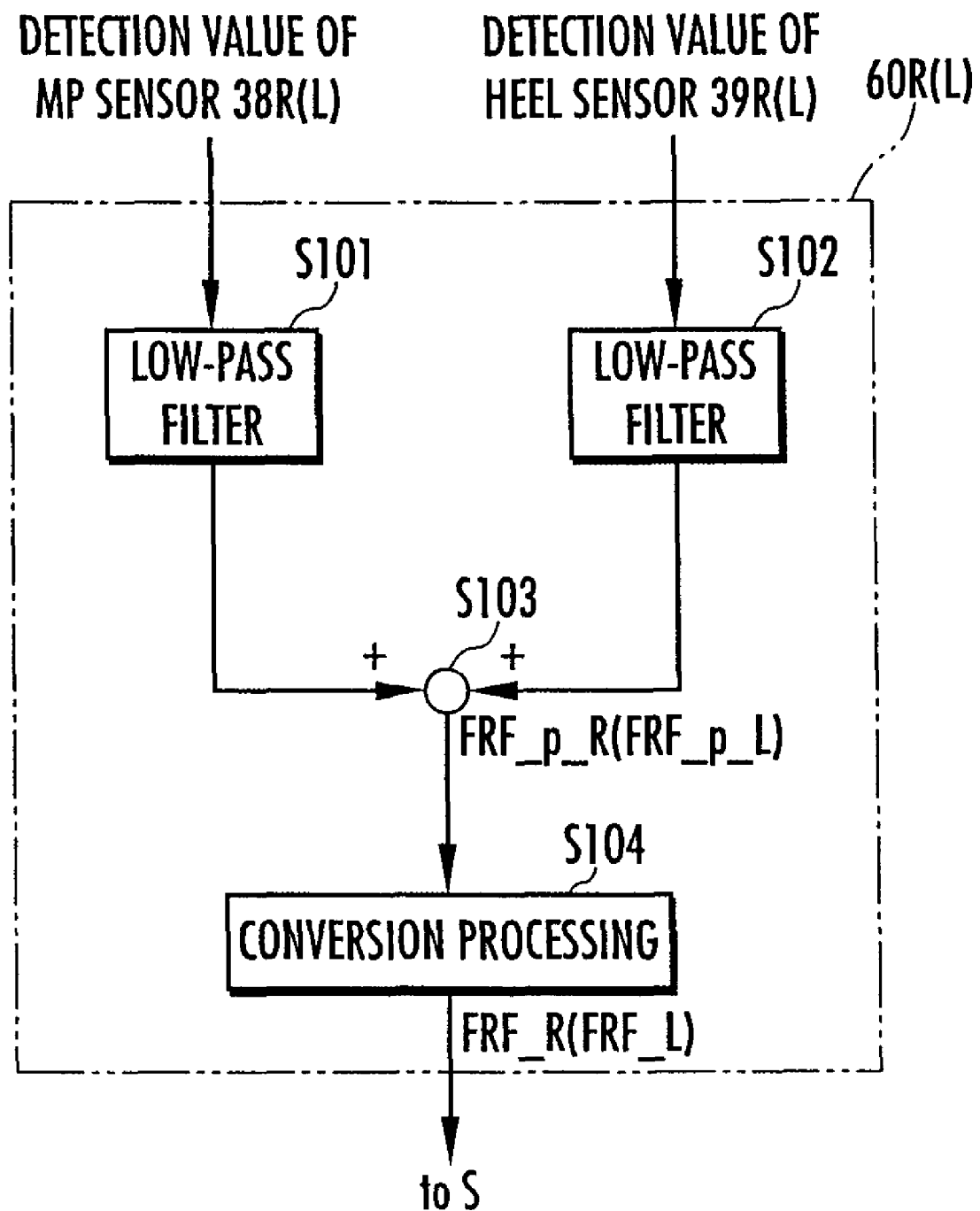
FIG. 6 is a block diagram showing the flows of the processing of treading force measurers 60R and 60L of the arithmetic processor 51.

In each control processing cycle, the arithmetic processor 51 first carries out the processing of the treading force measurers 60R and 60L. This processing will be explained with reference to FIG. 6. FIG. 6 is a block diagram showing the flows of the processing by the treading force measurers 60R and 60L. The treading force measurers 60R and 60L share the same algorithm of processing, so that any components related to the left treading force measurer 60L are shown in parentheses in FIG. 6.

As representative processing, the processing of the right treading force measurer 60R will be explained. First, a detection value of the MP sensor 38R (the detection value of a force indicated by an output voltage value of the MP sensor 38R) and a detection value of the heel sensor 39R (the detection value of a force indicated by an output voltage of the heel sensor 39R) of the leg link 3R are passed through low-pass filters in S101 and S102, respectively. The low-pass filters remove high-frequency components, such as noises, from the detection values of the sensors 38R and 39R. The cutoff frequencies of the low-pass filters are set to, for example, 100 Hz.

Subsequently, the outputs of the low-pass filters are added in S103. This provides a provisional measurement value FRF_p_R of the treading force of the right leg of the user A. The provisional measurement value FRF_p_R contains an error component resulting mainly from the tightening of the shoelace of the right foot-worn assembly 15R.

Hence, in the present embodiment, the provisional measurement value FRF_p_R is subjected to conversion processing in S104. This provides a final measurement value FRF_R of the treading force of the right leg of the user A. The conversion processing of S104 is carried out according to the table shown in FIG. 7. More specifically, if FRF_p_R is a predetermined first threshold value FRF1 or less, then the measurement value FRF_R is set to zero. This prevents a very small error component attributable mainly to the tightening of the shoelace of the foot-worn assembly 15R from being obtained as the measurement value FRF_R. If the provisional measurement value FRF_p_R is larger than the first threshold value FRF1 but a second threshold value FRF2 (>FRF1) or less, then the measurement value FRF_R is linearly increased as the value of FRF_p_R increases. If FRF_p_R exceeds the second threshold value FRF2, then the value of FRF_R is retained at a predetermined upper limit value (the value of FRF_R obtained when FRF_p_R equals the second threshold value FRF2). The reason for setting the upper limit value of FRF_R will be discussed hereinafter.

The above describes the processing of the right treading force measurer 60R. The same processing applies to the left treading force measurer 60L.

Figure 8:
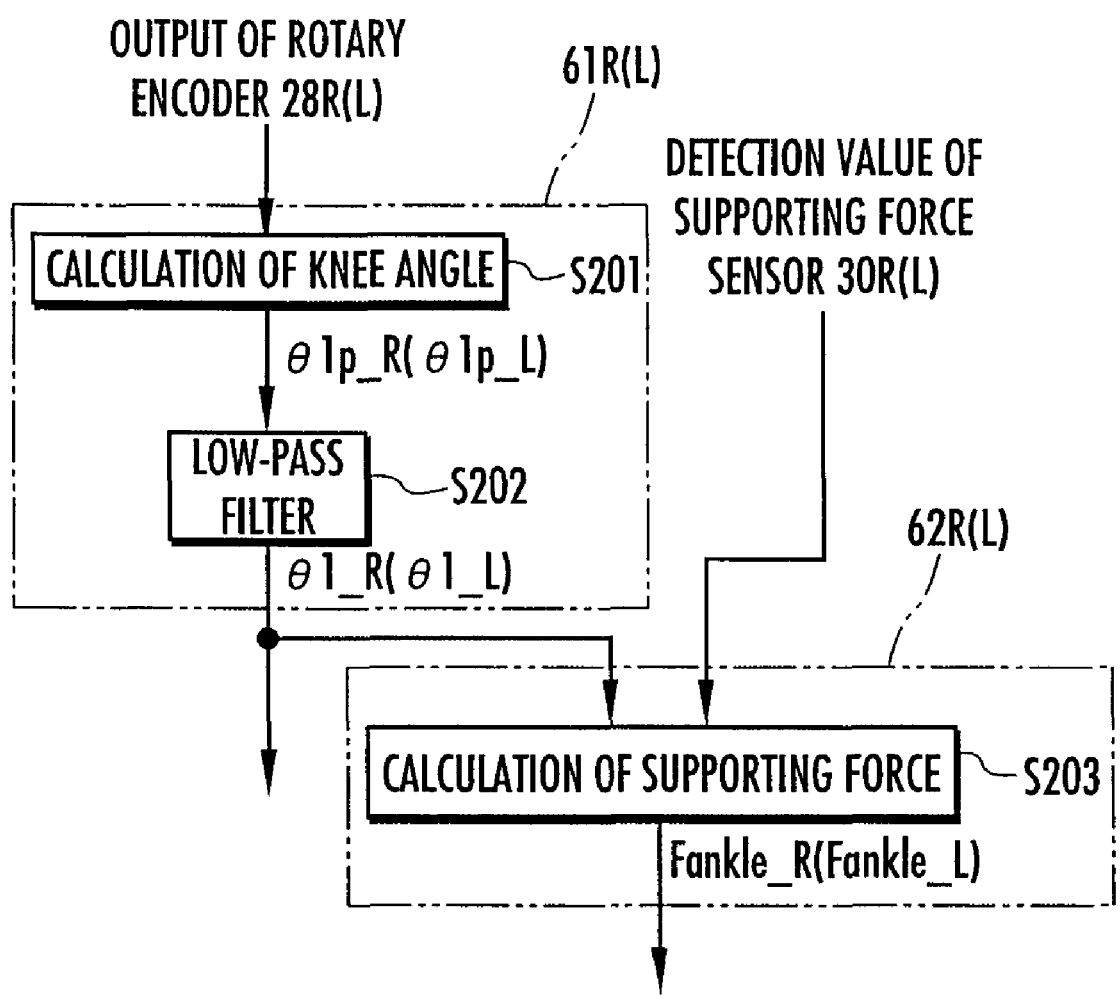
FIG. 8 is a block diagram showing the flows of the processing of knee angle measurers 61R and 61L of the arithmetic processor 51 and the processing of supporting force measurers 62R and 62L.

The arithmetic processor 51 then carries out in sequence the processing of the knee angle measurers 61R, 61L and the processing of the supporting force measurers 62R, 62L. These processing will be explained below with reference to FIG. 8 and FIG. 9. FIG. 8 is a block diagram showing the flows of the processing of the knee angle measurers 61R, 61L and the processing of the supporting force measurers 62R, 62L. The knee angle measurers 61R and 61L share the same processing algorithm, and the supporting force measurers 62R and 62L also share the same processing algorithm. For this reason, any components related to the left knee angle measurer 61L and the left supporting force measurer 62L are shown in parentheses in FIG. 8.

As representative processing, the processing of the right knee angle measurer 61R and the right supporting force calculator 62R will be explained. First, the right knee angle measurer 61R carries out the processing of S201 and S202 to obtain a measurement value $\theta 1\_R$ of a knee angle of the right leg link 3R (the bending angle of the leg link 3R in the second joint 12R). In S201, a provisional measurement value $\theta 1p\_R$ of a knee angle of the leg link 3R is calculated from an output of the rotary encoder 28R.

Figure 9:
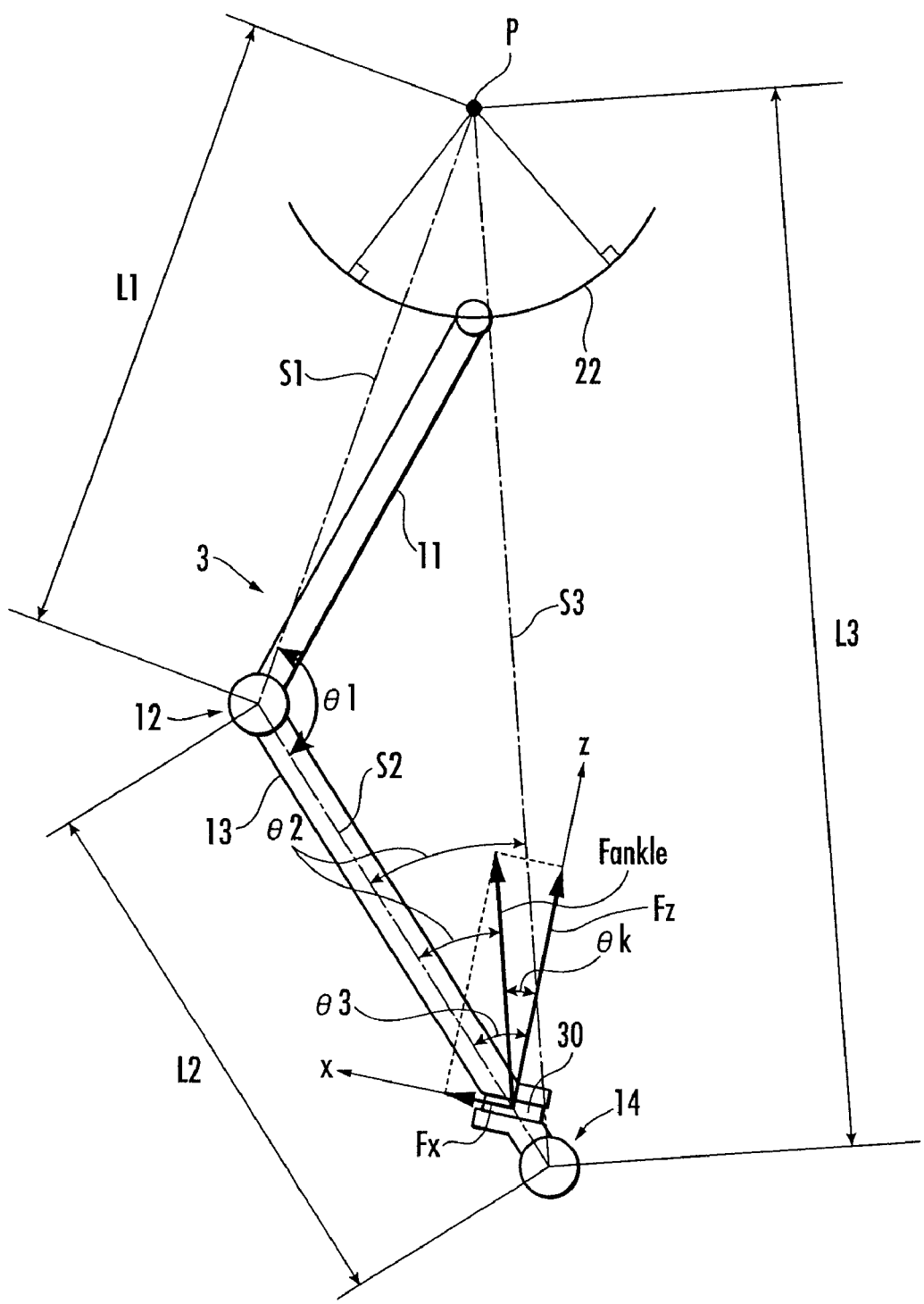
FIG. 9 is a diagram for explaining the processing of S201 and S203 shown in FIG. 8.

Referring now to FIG. 9, in the present embodiment, an angle $\theta 1\_R$ formed by a segment S1 that connects the central point P related to the first joint 10R of the leg link 3R (the point P provides the rotational center of longitudinal swing motions of the thigh frame 11R; the point P will be hereinafter referred to as the longitudinal swing central point P) and the central point of the second joint 12R and a segment S2 that connects the central point of the second joint 12R and the central point of the third joint 14R is measured as the knee angle of the right leg link 3R. The same applies to the knee angle of the left leg link 3L. FIG. 9 schematically shows the construction of the essential section of the leg link 3.

In this case, in S201 mentioned above, the reference rotational position of the second joint 12R is defined in a state wherein the thigh frame 11R and the crus frame 13R of the leg link 3R hold a predetermined posture relationship (e.g., the posture state shown in FIG. 1), that is, in the state wherein the knee angle $\theta 1\_R$ takes a predetermined value. A rotational amount from the reference rotational position is measured from an output signal of the rotary encoder 28R. The rotational amount here means the amount of a change in the rotational angle, and it is proportional to the rotational amount of the rotor of the electric motor 27R. The value obtained by adding the measured rotational amount of the second joint 12R to the value of a knee angle of the leg link 3R at the aforesaid reference rotational position, which is stored and retain in a memory (not shown) beforehand, is determined as the provisional measurement value $\theta 1p\_R$.

The provisional measurement value $\theta 1p\_R$ sometimes contains a high-frequency noise component. Hence, the $\theta 1p\_R$ R is passed through a low-pass filter in S202 to obtain a final measurement value $\theta 1\_R$ of a knee angle of the leg link 3R.

The above describes the processing of the right knee angle measurer 61R. The same processing applies to the left knee angle measurer 61L.

Supplementally, in the present embodiment, the reason for measuring the angle $\theta 1$ formed by the segments S1 and S2 as the knee angle of the leg link 3 is because the measurement value of the angle $\theta 1$ is used mainly for the processing of the right/left desired lifting force determiner 63, the details of which will be discussed hereinafter. In this case, in the walking assist apparatus 1 according to the present embodiment, the angle formed by the axis of the thigh frame 11 of the leg link 3 and the segment S1 is constant. Hence, in each knee angle measurers 61, the angle formed by, for example, the axis of the thigh frame 11 of the leg link 3 and the segment S2 related to the crus frame 13 may be determined beforehand as the knee angle of the leg link 3. The angle $\theta 1$ may be determined from the knee angle by the processing of the right/left desired lifting force determiner 63, which will be described later.

After the measurement value $\theta 1\_R$ of the knee angle of the leg link 3R is determined as described above, the processing of the right supporting force measurer 62R is carried out in S203. In this processing, a measurement value Fankle_R of a supporting force acting on the supporting force sensor 30R, i.e., the total lifting force share of the leg link 3R, is calculated from the measurement value $\theta 1\_R$ of the knee angle obtained in S202 and the detection values of the supporting force sensor 30R, i.e., the detection values of the forces of two axes indicated by the voltage values of output signals of the supporting force sensor 30R. This processing will be explained in detail with reference to FIG. 9.

The supporting force, namely, the total lifting force share, Fankle_R acting on the supporting force sensor 30R of the leg link 3R is substantially equal to the translational force acting on the crus frame 13R from the third joint 14R of the leg link 3R, as described above. Further, in the walking assist apparatus 1 according to the present embodiment, the direction of the translational force and the direction of Fankle_R are parallel to a segment S3 that connects the central point of the third joint 14 of the leg link 3R and the central point P of the longitudinal swing.

Meanwhile, the supporting force sensor 30R detects a force Fz in a z-axis direction perpendicular to the surface (the upper surface or the lower surface) of the supporting force sensor 30R and a force Fx in an x-axis direction, which is perpendicular to the z-axis and parallel to the surface of the supporting force sensor 30R, as shown in the figure. The x-axis and the z-axis are coordinate axes fixed to the supporting force sensor 30R, and are parallel to a plane that includes the arc of the guide rail 22. At this time, the detected Fz and Fx denote a component in the z-axis direction and a component in the x-axis direction, respectively, of Fankle_R. Accordingly, as illustrated, if the angle formed by Fankle_R and the z-axis is denoted as $\theta k$, then Fankle_R can be calculated according to the following expression (1) from the detection values of Fz and Fx and $\theta k$.

$$\text{Fankle}\_R = Fx \cdot \sin \theta k + Fz \cdot \cos \theta k \quad (1)$$

The angle $\theta k$ is determined as follows. If the angle formed by the segment S2 and the segment S3 (=the angle formed by the direction of Fankle and the segment S2) is denoted as $\theta 2$, lengths L1 and L2 of the segments S1 and S2, respectively, in a triangle having the segments S1, S2 and S3 as its three sides are set to constant values, i.e., known values set in advance. The angle $\theta 1$ formed by the segments S1 and S2 is the measurement value $\theta 1\_R$ obtained as described above in relation to the right knee angle measurer 61R. Therefore, the angle $\theta 2$ is determined by geometric calculation from the lengths L1 and L2 (these values being stored and retained in a memory beforehand) of the segments S1 and S2, respectively, and the measurement value $\theta 1\_R$ of the angle $\theta 1$.

Specifically, in the triangle having the segments S1, S2 and S3 as its three sides, the relational expressions of (2) and (3) given below hold. L3 denotes the length of the segment S3.

$$L3^2 = L1^2 + L2^2 - 2 \cdot L1 \cdot L2 \cdot \cos \theta 1 \quad (2)$$

$$L1^2 = L2^2 + L3^2 - 2 \cdot L2 \cdot L3 \cdot \cos \theta 2 \quad (3)$$

Thus, L3 can be calculated according to expression (2) from the values of L1 and L2 and the measurement value of the angle $\theta 1$. Then, the angle $\theta 2$ can be calculated according to expression (3) from the calculated value of L3 and the values of L1 and L2.

Further, if the angle formed by the z-axis and the segment S2 is denoted by θ3, then this angle θ3 takes a constant value set beforehand on the basis of the angle at which the supporting force sensor 30 is mounted on the crus frame 13. Then, the value of an angle θk required for the calculation of expression (1) can be determined by subtracting the angle θ2 calculated as described above from the angle θ3 of the constant value, this value being stored and retained in a memory (not shown) beforehand.

Thus, in the processing of S203 of the right supporting force measurer 62R in the present embodiment, the measurement value Fankle_R of the total lifting force share of the right leg link 3R can be obtained according to the above expression (1) from θk calculated as described above and the detection values Fx and Fz of the supporting force sensor 30 of the leg link 3R.

This completes the detailed explanation of the processing of S203 of the right supporting force measurer 62R. The same applies to the processing of the left supporting force measurer 62L.

In the present embodiment, the supporting force sensor 30 uses a three-axis force sensor or a two-axis force sensor to obtain the measurement value Fankle of the total lifting force share of each leg link according to the above expression (1). However, even if the supporting force sensor 30 is an one-axis force sensor, it is possible to obtain the measurement value Fankle. For example, if the supporting force sensor 30 uses a sensor that detects only the force Fx in the x-axis direction shown in FIG. 9, then the measurement value Fankle can be determined according to expression (4) given below. If the supporting force sensor 30 uses a sensor that detects only the force Fz in the z-axis direction shown in FIG. 9, then the measurement value Fankle can be determined according to expression (5) given below.

$$\text{Fankle} = Fx/\sin \theta k \quad (4)$$

$$\text{Fankle} = Fz/\cos \theta k \quad (5)$$

However, using expression (4) or (5) above leads to deteriorated accuracy in the value of Fankle as the value of the angle θk approaches 0 degrees or 90 degrees. For this reason, it is desirable to use expression (1) to obtain the measurement values of Fankle.

Alternatively, the measurement value Fankle may be obtained by determining the square root of the sum of a square value of Fx and a square value of Fz. In this case, the measurement value θ1 of the knee angle is unnecessary.

Supplementally, the processing of the measurers 60, 61, and 62 explained above does not necessarily have to be carried out in sequence. For instance, the processing of the measurers 60, 61, and 62 may alternatively be carried out in parallel by a time-sharing manner or the like. If, however, θ1 is used in the processing of the supporting force measurers 62R and 62L, then the processing of the knee angle measurers 61R and 61L must be implemented before the processing of the supporting force measurers 62R and 62L.

In the present embodiment, a supporting force sensor 30 (the second force sensor) for measuring the total lifting force share of the leg links 3 is located between the third joint 14 and the crus frame 13 (the upper crus frame 13a to be more accurate). Alternatively, however, the supporting force sensor may be installed between the third joint 14 and the foot-worn assembly 15, e.g., between the third joint 14 and the connection 34 of the foot-worn assembly 15. In this case, the supporting force acting on the crus frame 13 from the third joint 14 can be measured by measuring the rotational angle of the third joint 14 and coordinate-converting the supporting force detected by the supporting force sensor positioned between the third joint 14 and the foot-worn assembly 15.

Figure 10:
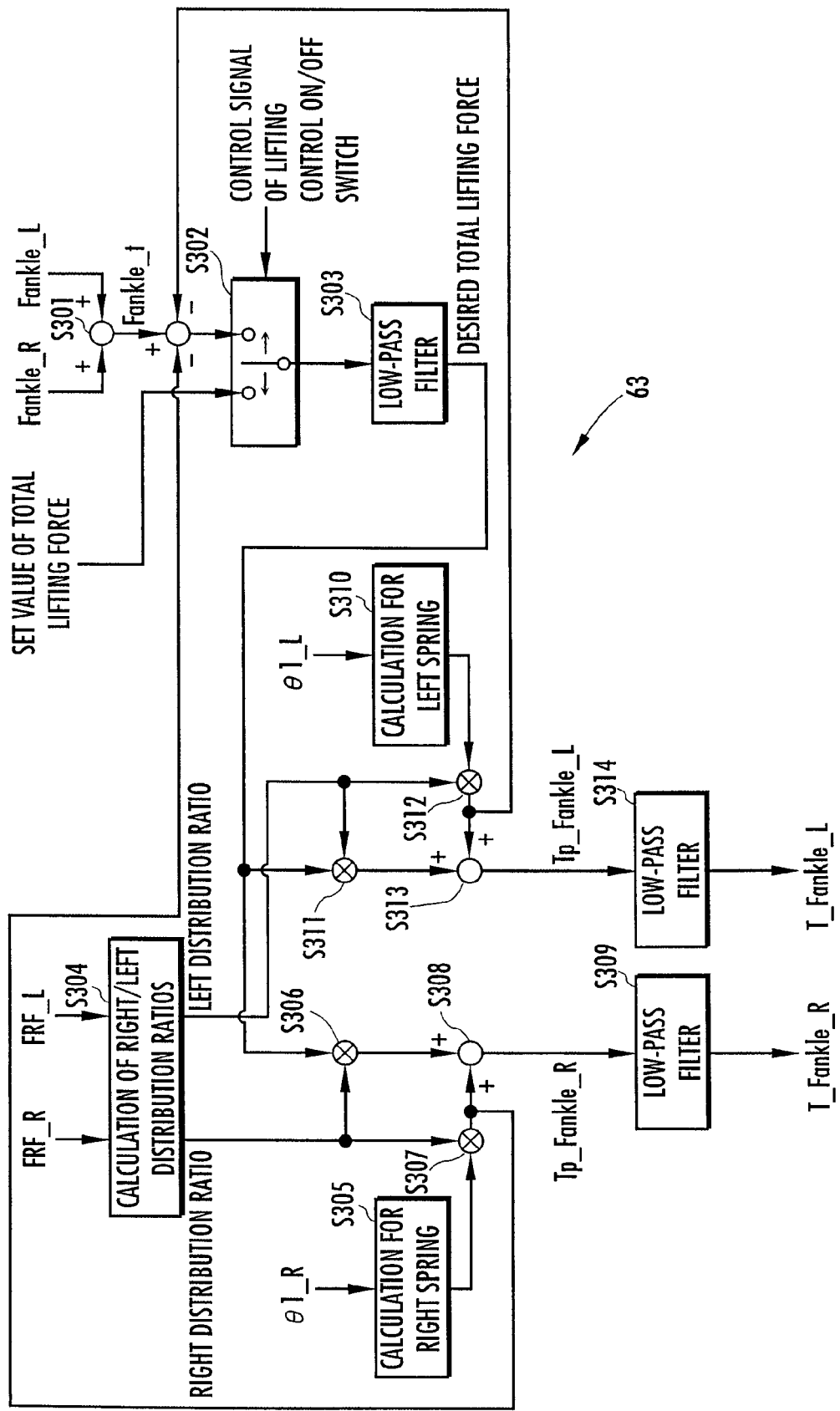
FIG. 10 is a block diagram showing the flow of the processing of a right/left desired lifting force determiner 63 of the arithmetic processor 51.

Subsequently, the arithmetic processor 51 carries out the processing of the right/left desired lifting force determiner 63. This processing will be explained in detail below with reference to FIG. 10. FIG. 10 is a block diagram showing the flow of the processing of the right/left desired lifting force determiner 63.

First, in S301, the measurement value Fankle_R of the total lifting force share of the right leg link 3R and the measurement value Fankle_L of the total lifting force share of the left leg link 3L determined by the supporting force measurers 62 as described above are added to obtain a total lifting force Fankle_t. This total lifting force Fankle_t corresponds to the measurement value of the total sum on both leg links 3 and 3, namely, the total sum of the supporting forces acting on the supporting force sensors 30 or the translational forces acting on the crus frames 13 from the third joints 14 of the leg links 3. The total lifting force Fankle_t is substantially equal to the supporting force borne by the assist system.

Subsequently, either the value obtained by subtracting an output value of S307 and an output value of S312, which will be discussed hereinafter, from the total lifting force Fankle_t or the total lifting force set value associated with the lifting force (desired lifting force) applied to the user A from the seat 2 set by the lifting force setting key switch 53 is selectively output in S302 according to a control signal of the lifting control ON/OFF switch 54, i.e., a signal indicating whether the switch 54 is ON or OFF. In this case, according to the present embodiment, the lifting control ON/OFF switch 54 is turned on when the user A wishes to receive a lifting force from the seat 2; otherwise, the lifting control ON/OFF switch 54 is held OFF. In S302, if the lifting control ON/OFF switch 54 is OFF, then the value obtained by subtracting an output value of S307 and an output value of S312, which will be discussed later, from the total lifting force Fankle_t is selected and output. If the lifting control ON/OFF switch 54 is ON, then the total lifting force set value is selected and output.

Supplementally, the total lifting force set value is obtained by adding the magnitude of the supporting force for supporting the weight, which is determined by subtracting the total weight of the portions below the supporting force sensors 30 from the weight of the entire walking assist apparatus 1 (i.e., the supporting force that balances out the gravity generated by the weight obtained by the subtraction), to the set value of a lifting force input through the key switch 53. The magnitude of the supporting force is stored and retained in a memory, which is not shown. The total weight of the portions below the supporting force sensors 30 is sufficiently smaller than the weight of the entire walking assist apparatus 1. Hence, the result obtained by adding the magnitude of a supporting force for supporting the weight of the entire walking assist apparatus 1, i.e., the supporting force that balances out the gravity acting on the entire walking assist apparatus 1, to the lifting force set value (desired lifting force) may be determined as the total lifting force set value. Alternatively, an arrangement may be made so that a total lifting force set value may be directly entered by operating the key switch 53.

Subsequently, the output of S302 is passed through a low-pass filter in S303. Thus, the desired total lifting force is determined. The low-pass filter in S303 functions to restrain a sudden change in a desired total lifting force if an output of S302 suddenly changes. Such a sudden change takes place when, for example, a total lifting force set value is changed or when an output of S302 is switched between the value obtained by subtracting an output value of S307 and an output value of S312, which will be discussed later, from the total lifting force Fankle_t and a total lifting force set value. This means that the low-pass filter serves to restrain a sudden change in the lifting force acting on the user A from the seat 2. The cutoff frequency of the low-pass filter is, for example, 0.5 Hz. The processing of S301 to S303 corresponds to the total desired lifting force determiner in the present invention.

Subsequently, in S304, a distribution ratio, which is a ratio for distributing a desired total lifting force to the right and left leg links 3, respectively, is determined on the basis of the magnitude of the measurement value FRF_R of a treading force of the right leg and the magnitude of the measurement value FRF_L of a treading force of the left leg that have been determined by the treading force measurer 60. This distribution ratio is composed of a right distribution ratio, which is the ratio of allocation to the right leg link 3R, and a left distribution ratio, which is the ratio of allocation to the left leg link 3L, of a desired total lifting force, the sum of both distribution ratios being 1.

In this case, the right distribution ratio is determined to be FRF_R/(FRF_R+FRF_L), which is the ratio of the magnitude of FRF_R relative to the sum of the magnitude of the measurement value FRF_R and the magnitude of the measurement value FRF_L. Similarly, the left distribution ratio is determined to be FRF_L/(FRF_R+FRF_L), which is the ratio of the magnitude of FRF_L relative to the sum of the magnitude of the measurement value FRF_R and the magnitude of the measurement value FRF_L. In this case, in a state wherein one of the legs of the user A is a standing leg, while the other leg is a free leg, i.e., in a one-leg supporting state, the distribution ratio for the free leg is zero, and the distribution ratio for the standing leg is 1. The processing of S304 may be carried out in parallel to the processing of S301 to S303 described above.

The following will explain the reason for setting an upper limit value of the measurement value FRF of a treading force of each leg in the conversion processing in S104 of each treading force measurer 60 (see FIG. 6). In a state wherein both legs of the user A are standing, i.e., the state in a two-leg supporting period, the provisional measurement value FRF_p of a treading force of each leg usually does not smoothly change, but tends to frequently change. In such a case, if the right and left distribution ratios were determined on the basis of the provisional measurement value FRF_p, then the distribution ratio would frequently change and the allocation ratio of each leg link 3 out of a desired total lifting force would be apt to change accordingly. As a result, a minute change would easily take place in a lifting force acting on the user A from the seat 2. The minute change may cause the user A to feel uncomfortable. For this reason, according to the present embodiment, an upper limit value of the measurement value FRF of a treading force of each leg has been set to restrain frequent changes in the right and left distribution ratios in the state of a two-leg supporting period. In this case, in the state of a two-leg supporting period, both the right and left distribution ratios will be basically maintained at 1/2 except for a period immediately after the start of the two-leg supporting period and a period immediately before the end thereof, thus stabilizing the right and left distribution ratios.

Figure 7:
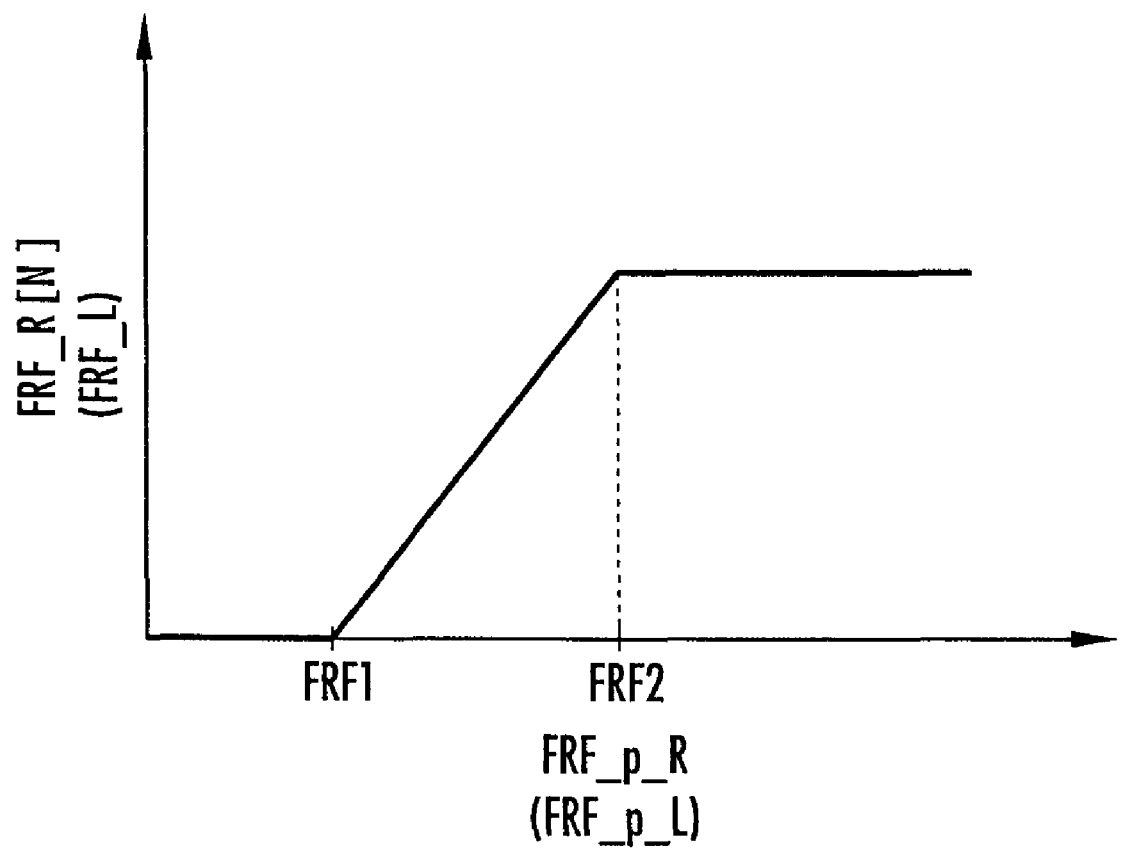
FIG. 7 is a graph showing a table used for the processing of S104 shown in FIG. 6.

In FIG. 7 mentioned above, the measurement value FRF_R(L) may be obtained according to the table which has only the threshold value FRF1 and in which the measurement value FRF_R(L) of a treading force linearly increases if the provisional measurement value FRF_p_R(L) of a treading force of each leg of the user A is the threshold value FRF1 or more. The threshold values FRF1, FRF2 and the like of the table for obtaining FRF_R(L) from the provisional measurement value FRF_p may be appropriately determined on the basis of the lifting force that feels comfortable to the user A, the weight of the walking assist apparatus 1, the calculation capability of the control device 50, and the like.

Returning to the explanation of FIG. 10, the processing of S305 and S310 is carried out. The processing of S305 and S310 may be implemented in parallel to the processing of S301 to S303 or the processing of S304.

The processing of S305 determines an operating force for generating a posture restoring force like that of a spring in the right leg link 3R. Similarly, the processing of S310 determines an operating force for generating a posture restoring force like that of a spring in the left leg link 3L. Hereinafter, these operating forces will be referred to as "the spring restoring force." The spring restoring force corresponds to the required force in the present invention.

The processing of S305 and the processing of S310 share the same algorithm, so that the following will representatively explain the processing of S305 related to the right leg link 3R with reference to FIG. 9.

In the processing of S305, the measurement value θ1_R of the knee angle of the leg link 3R determined by the processing of the right knee angle measurer 61R as described above is used to calculate the length L3 of the segment S3 shown in FIG. 9, i.e., the length L3 of the segment S3 that connects the central point of the third joint 14 of the leg link 3R and the central point P of the longitudinal swing, according to the above expression (2). A value obtained by subtracting a predetermined reference value L3S from the calculated L3 (L3−L3S) is multiplied by a predetermined spring constant k so as to determine the spring restoring force of the right leg link 3R.

More specifically, the spring restoring force is calculated according to the following expression (6).

$$\text{Spring restoring force} = k \cdot (L3 - LS3) \qquad (6)$$

The same applies to the processing of the aforesaid S310 related to the left leg link 3L. The spring restoring force of each leg link 3 calculated as described above corresponds to the supporting force to be additionally applied to the walking assist apparatus 1 in order to restore the posture of the leg link 3 back to the posture in which the length L3 of the segment S3 shown in FIG. 9 agrees with the reference value L3S.

In the present embodiment, the spring restoring force is determined according to a proportional control law as a feedback control law; alternatively, however, other techniques, such as the PD control law, may be used. The length L3 of the segment S3 is equal to the length obtained by adding a substantially constant offset value to the interval between the third joint 14 of each leg link 3 and the seat 2. Thus, calculating a spring restoring force such that the difference (L3−L3S) approximates zero is equivalent to calculating the spring restoring force such that the difference between the interval between the third joint 14 of each leg link 3 and the seat 2 and the predetermined reference value (the value obtained by subtracting the aforesaid offset value from L3S) approximates zero.

Subsequently, the processing of S306 to S309 related to the right leg link 3R and the processing of S311 to S314 related to the left leg link 3L are carried out. In the processing of S306 to S309 related to the right leg link 3R, first, in S306, the desired total lifting force obtained in S303 is multiplied by a right distribution ratio. This determines a reference desired value of the total lifting force share to be borne by the right leg link 3R out of the desired total lifting force. This reference desired value means the total sum of the share of the right leg link 3R out of a desired lifting force, which is the desired value of a lifting force to be applied to the user A from the seat 2, and the share of the right leg link 3R out of a supporting force for supporting the weight obtained by subtracting the total weight of the portions under the supporting force sensors 30 from the weight of the entire walking assist apparatus 1 (or the weight of the entire walking assist apparatus 1).

Further, in S307, the spring restoring force determined in S305 is multiplied by the right distribution ratio. Then, the value obtained as the result of the multiplication, which corresponds to the correction amount of a desired share in the present invention, is added to the reference desired value of the total lifting force share of the right leg link 3R in S308. This determines a provisional desired value Tp_Fankle_R of the total lifting force share of the right leg link 3R. Then, the provisional desired value Tp_Fankle_R is passed through a low-pass filter in S309, thereby finally determining a control desired value T_Fankle_R, which is the desired value of the total lifting force share of the right leg link 3R. The low-pass filter of S309 functions to remove noise components attributable mainly to changes in the knee angle $\theta 1$. The cutoff frequency is set to, for example, 15 Hz.

Similarly, in the processing of S311 to S314 related to the left leg link 3L, first, in S311, the desired total lifting force obtained in S303 is multiplied by a left distribution ratio. This determines a reference desired value of the total lifting force share to be borne by the left leg link 3L out of the desired total lifting force. This reference desired value means the total sum of the share of the left leg link 3L out of a desired lifting force, which is the desired value of a lifting force to be applied to the user A from the seat 2, and the share of the left leg link 3L out of a supporting force for supporting the weight obtained by subtracting the total weight of the portions under the supporting force sensors 30 from the weight of the entire walking assist apparatus 1 (or the weight of the entire walking assist apparatus 1).

Further, in S312, the spring restoring force determined in S310 is multiplied by the left distribution ratio. Then, the value obtained as the result of the multiplication, which corresponds to the correction amount of a desired share in the present invention, is added to the reference desired value of the total lifting force share of the left leg link 3L in S313. This determines a provisional desired value Tp_Fankle_L of the total lifting force share of the left leg link 3L. Then, the provisional desired value Tp_Fankle_L is passed through a low-pass filter in S314, thereby finally determining a control desired value T_Fankle_L, which is the desired value of the total lifting force share of the left leg link 3L. For instance, if a desired total lifting force, which is an output of S303, is 200 N (Newton) and the right and left distribution ratio (an output of S304) based on the right and left treading forces of the user A is 0.6:0.4, then the output of S306 will be 120 N and the output of S311 will be 80 N.

The above is the processing of the right/left desired lifting force determiner 63. As described above, basically, the control desired values T_Fankle_R and T_Fankle_L of the right and left leg links 3 are determined such that the ratios thereof will be the same as the ratios of the right and left treading forces of the user A. Further, spring restoring forces related to the right leg link 3R and the left leg link 3L are added to the control desired values T_Fankle_R and T_Fankle_L, respectively. The total sum of the spring restoring force added to the control desired value T_Fankle_L and the spring restoring force added to the control desired value T_Fankle_R will be a weighted average value, which uses the right and left distribution ratios of the spring restoring forces calculated in S305 and S310, respectively, as weight coefficients. Accordingly, the total sum of the control desired values T_Fankle_R and T_Fankle_L will be a value obtained by adding the weighted average value of the spring restoring force to the desired total lifting force determined in S303.

The processing of S304, S306, and S311 corresponds to the distributing means in the present invention. The processing of S305, S307, S310, and S312 corresponds to the desired share correcting means in the present invention.

After carrying out the processing of the right/left desired lifting force determiner 63 is carried out as described above, the arithmetic processor 51 implements the processing of the feedback manipulated variable determiners 64R, 64L and the feedforward manipulated variable determiners 65R, 65L in sequence or in parallel.

Figure 11:
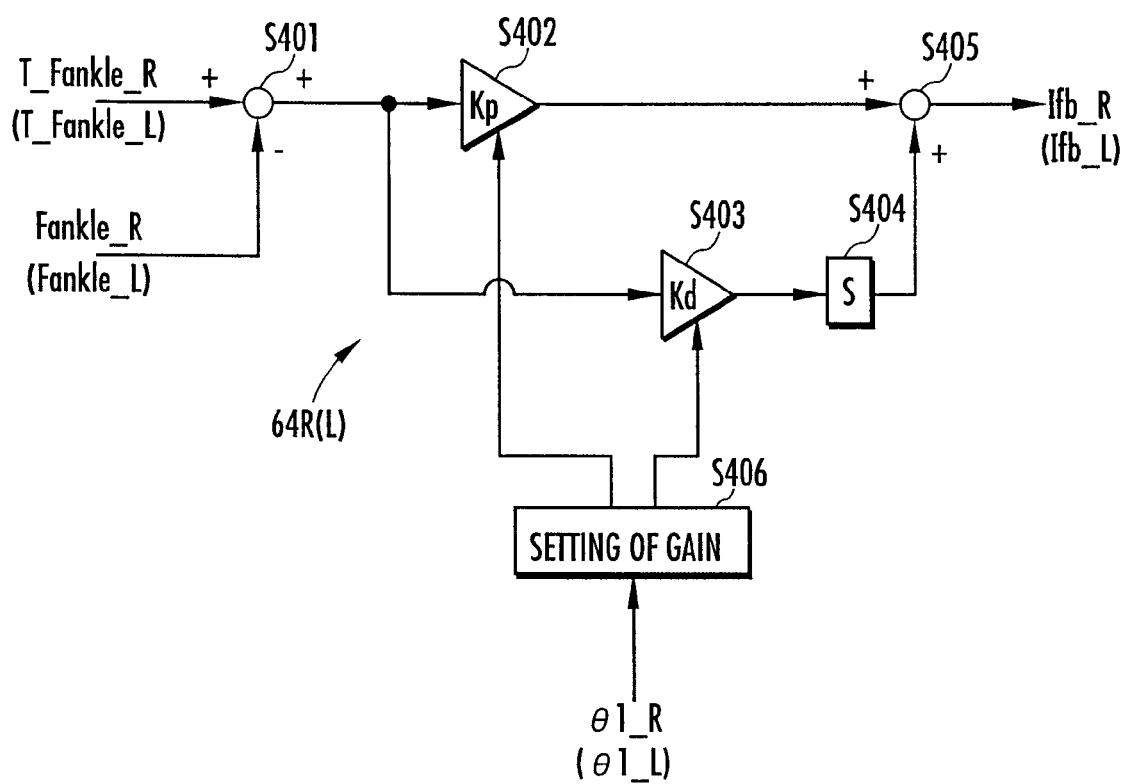
FIG. 11 is a block diagram showing the flows of the processing of feedback manipulated variable determiners 64R and 64L of the arithmetic processor 51.

The processing of the feedback manipulated variable determiners 64R, 64L will be explained with reference to FIG. 11. FIG. 11 is a block diagram showing the flows of the processing of the feedback manipulated variable determiners 64R, 64L. The feedback manipulated variable determiners 64R, 64L share the same algorithm, so that any components related to the left feedback manipulated variable determiner 64L are shown in parentheses in FIG. 11.

The processing of the right feedback manipulated variable determiner 64R will be representatively explained. First, a difference (T_Fankle_R−Fankle_R) between a control desired value T_Fankle_R of the right leg link 3R determined by the right/left desired lifting force determiner 63 and a measurement value Fankle_R of the total lifting force share of the right leg link 3R measured by the right supporting force measurer 62 is calculated in S401. Then, the difference is multiplied by gains Kp and Kd in S402 and S403, respectively. The calculation result of S403 is differentiated in S404 ("s" in the figure denoting a differential operator), and the differential value and the calculation result of S402 are added in S405. Thus, a manipulated variable Ifb_R of the current of the right electric motor 27 is calculated according to the PD control law, which serves as the feedback control law, such that the difference (T_Fankle_R−Fankle_R) converges to zero. The manipulated variable Ifb_R means a feedback component of an indicator current value of the right electric motor 27.

In this case, according to the present embodiment, the values of the gains Kp and Kd are variably set on the basis of the measurement value $\theta 1\_R$ of a knee angle of the leg link 3R. This is because the sensitivity of the electric motor 27R to changes in the lifting force of the seat 2 in response to changes in current or changes in torque, of the electric motor 27R varies according to the knee angle of the leg link 3R. In this case, as the knee angle $\theta 1\_R$ increases, that is, as the leg link 3R stretches, the sensitivity of the electric motor 27R to the changes in the lifting force of the seat 2 in response to changes in current or changes in torque increases. Hence, in S406, the values of gains Kp and Kd are basically set such that the values of the gains Kp and Kd are reduced as the measurement value $\theta 1\_R$ of the knee angle of the leg link 3R increases according to a data table, which is not shown.

The above explains the processing of the right feedback manipulated variable determiner 64R. The same applies to the processing of the left feedback manipulated variable determiner 64L. In the present embodiment, the PD control law is used as the feedback control law so as to permit quick and stable control of lifting forces. Alternatively, however, a feedback control law other than the PD control law may be used as the feedback control law for the aforesaid purpose.

Figure 12:
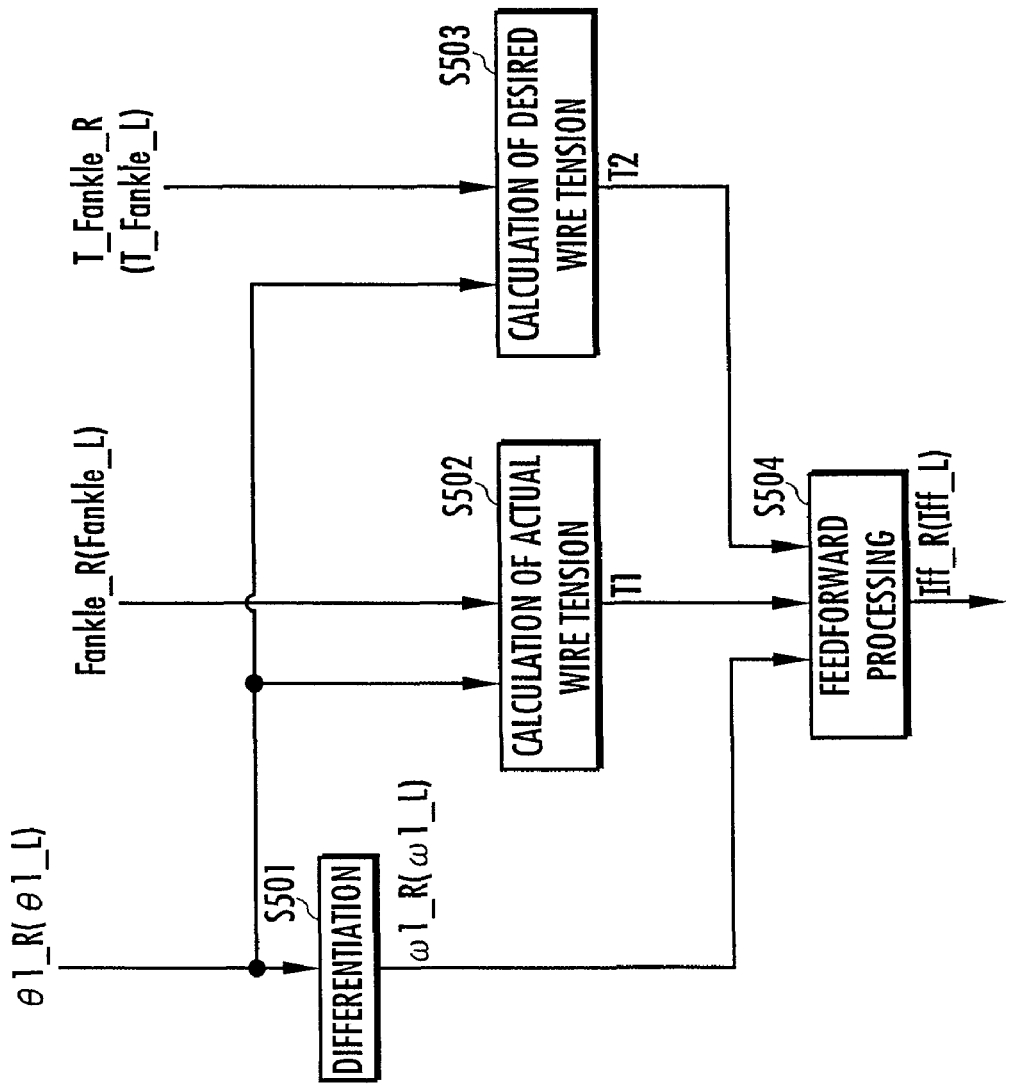
FIG. 12 is a block diagram showing the flows of the processing of feedforward manipulated variable determiners 65R and 65L of the arithmetic processor 51.

Referring now to FIG. 12, the processing of the feedforward manipulated variable determiners 65R and 65L will be explained. FIG. 12 is a block diagram showing the flows of the processing of the feedforward manipulated variable determiners 65R and 65L. The algorithms of the feedforward manipulated variable determiners 65R and 65L share the same algorithm, so that any components related to the left feedforward manipulated variable determiner 65L are shown in parentheses in FIG. 12.

Figure 13:
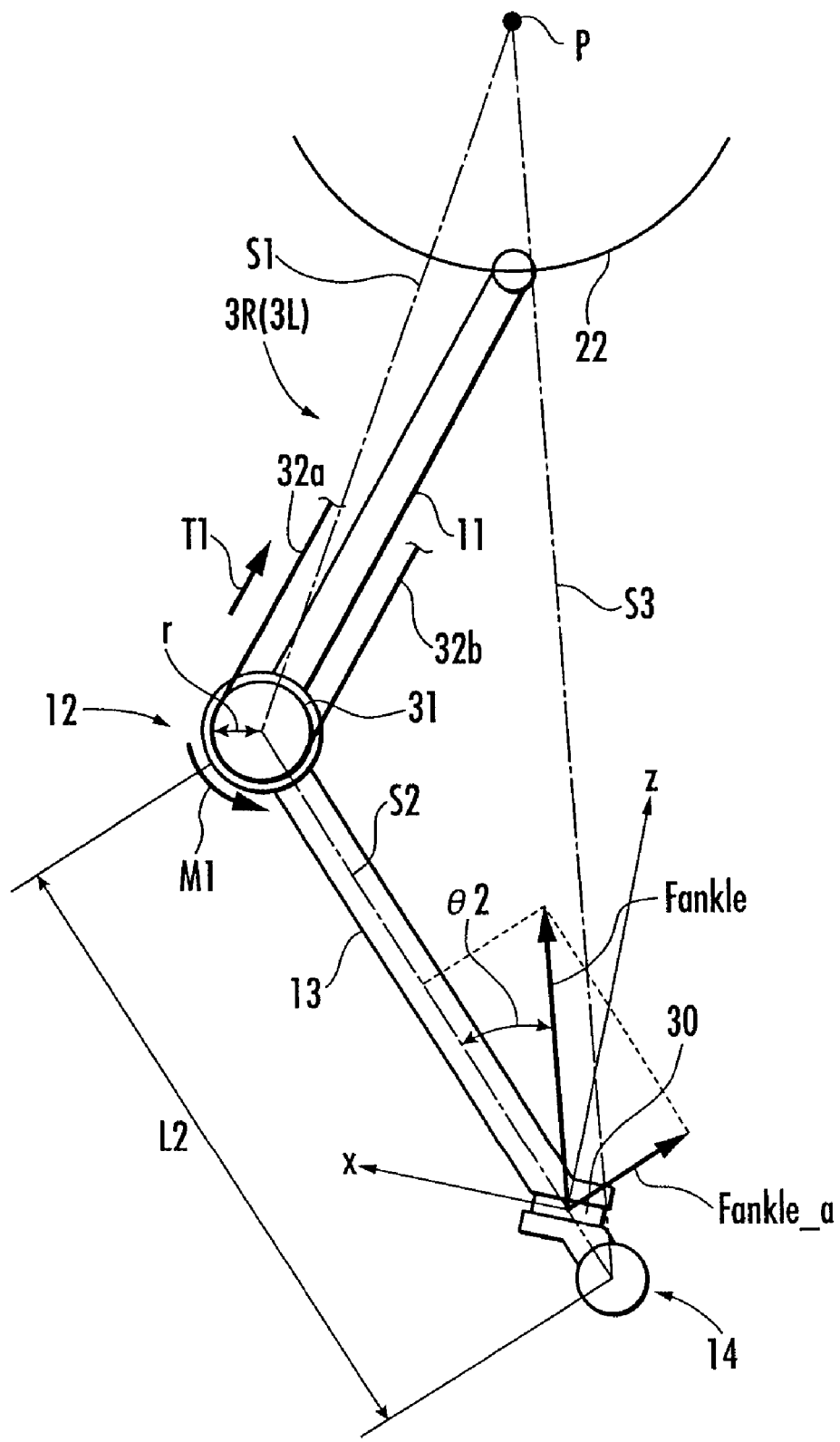
FIG. 13 is a diagram for explaining the processing of S502 shown in FIG. 12.

The processing of the right feedforward manipulated variable determiner 65R will be representatively explained. In S501, the measurement value θ1_R of the knee angle of the leg link 3R measured by the knee angle measurer 61R is differentiated to calculate an angular velocity ω1_R of a bending angle of the second joint 12 of the leg link 3R. Further, in S502, the measurement value θ1_R of the knee angle of the leg link 3R and the measurement value Fankle_R of the total lifting force share of the leg link 3R measured by the supporting force measurer 62R are used to calculate an actual tension T1, which is an actual tension of the wires 32a and 32b of the leg link 3R. The processing for calculating the actual tension T1 will be explained with reference to FIG. 13. In FIG. 13, the leg links 3 are schematically shown. Further, in FIG. 13, like elements as those in FIG. 9 are assigned like reference numerals.

First, a component Fankle_a that is orthogonal to the segment S2 of the measurement value Fankle_R of a total lifting force share of the leg link 3R is calculated according to the following expression (7).

$$Fankle\_a = Fankle\_R \cdot \sin\theta 2 \qquad (7)$$

The angle θ2 is an angle formed by Fankle_R and the segment S2, and the θ2 is calculated by geometric calculation using the measurement value θ1_R, as explained above with reference to FIG. 9 (refer to expressions (2) and (3) given above).

Then, the Fankle_a determined as described above is multiplied by the length L2 of the segment S2, as shown in the following expression (8). Thus, based on Fankle_R, a moment M1 generated in the second joint 12 (knee joint) is calculated.

$$M1 = Fankle\_a \cdot L2 \qquad (8)$$

The moment generated in the pulley 31 by the actual tension T1 of the wires 32a and 32b balances out the moment M1 in a steady state. Further, the moment M1 is divided by an effective radius r of the pulley 31 according to the following expression (9) so as to calculate the actual tension T1 of the wires 32a and 32b.

$$T1 = M1/r \qquad (9)$$

The above is the detailed explanation of the processing of S502.

Returning to the explanation of FIG. 12, further, a desired tension T2 of the wires 32a and 32b of the leg link 3R is calculated in S503. The desired tension T2 is a tension to be produced in the wires 32a and 32b on the basis of a control desired value (the desired value of a total lifting force share) of the leg link 3R determined in the processing of the right/left desired lifting force determiner 63. The desired tension T2 is calculated in the same manner as in the calculation processing in S502. More specifically, a component orthogonal to the segment S2 of the control desired value T_Fankle_R (refer to FIG. 13) is calculated according to an expression in which Fankle_R in the right side of the above expression (7) has been replaced by the control desired value T_Fankle_R of the leg link 3R determined by the processing of the tight/left desired lifting force determiner 63. Then, the calculated component replaces Fankle_a in the right side of the above expression (8) so as to calculate a desired moment of the second joint 12 of the leg link 3R. Further, the desired moment replaces M1 in the right side of the above expression (9) to obtain the desired tension T2 of the wires 32a and 32b.

The above explains the processing of S503.

After the processing of S501 to S503 is carried out, a manipulated variable of current of the electric motor 27R Iff_R is determined in S504 by predetermined feedforward processing by using the angular velocity ω1_R of the second joint 12, the actual tension T1 of the wires 32a and 32b, and the desired tension T2 calculated as described above. The manipulated variable Iff_R means a feedforward component of an indicator current value of the electric motor 27R.

In the processing of S504, the manipulated variable Iff_R is calculated according to a model expression represented by the following expression (10).

$$Iff\_R = B1 \cdot T2 + B2 \cdot \omega 1\_R + B3 \cdot sgn(\omega 1\_R) \qquad (10)$$

where B2=b0+b1·T1, B3=d0+d1·T1

In expression (10), B1 denotes the coefficient of a constant, and B2 and B3 denote the coefficients represented by linear functions of the actual tension T1, as indicated by the note on expression (10). Further, b0, b1, d0, and d1 denote constants, and sgn( ) denotes a sign function.

This expression (10) is a model expression representing the relationship among the current of the electric motor 27, the tension of the wires 32a and 32b, and the angular velocity ω1 of the second joint 12. To be more specific, a first term of the right side of expression (10) means the proportional term of tension, a second term means the term based on the viscous frictional force between the wires 32a, 32b and the pulley 31, and a third term means a term based on a dynamic frictional force between the wires 32a, 32b and the pulley 31. A term based on angular acceleration of the second joint 12, i.e., a term based on an inertial force, may be further added to the right side of expression (10).

Supplementally, the constants B1, b0, b1, d0, and d1 used for the calculation of expression (10) are experimentally identified by an identification algorithm that minimizes the square value of the difference between a value of the left side and a value of the right side of expression (10) beforehand. Then, the identified constants B1, b0, b1, d0, and d1 are stored and retained in a memory, not shown, and used when the walking assist apparatus 1 is operated.

This completes the explanation of the processing of the right feedforward manipulated variable determiner 65R. The same applies to the processing of the left feedforward manipulated variable determiner 65L.

Referring to FIG. 5, after calculating the manipulated variables Ifb_R and Iff_R of the current of the electric motor 27R and the manipulated variables Ifb_L and Iff_L of the current of the electric motor 27L as described above, the arithmetic processor 51 adds the manipulated variables Ifb_R and Iff_R by the adder 66R to determine the indicator current value of the electric motor 27R. Further, the arithmetic processor 51 adds the manipulated variables Ifb_L and Iff_L by the adder 66L to determine the indicator current value of the electric motor 27L. Then, the arithmetic processor 51 outputs these indicator current values to the driver circuits 52 associated with the individual electric motors 27. At this time, the driver circuit 52 energizes the electric motors 27 on the basis of the supplied indicator current values.

The control processing of the arithmetic processor 51 explained above is carried out at predetermined control cycles. Thus, the torque to be generated in the electric motors 27 and eventually the driving force of the second joint 12, namely, the knee joint, of the leg link 3 are controlled such that the measurement value Fankle of an actual total lifting force share of each leg link 3 agrees with or converges to the control desired value T_Fankle corresponding to the leg link 3.

In the embodiment explained above, a total desired lifting force is distributed to the right and left leg links 3R and 3L on the basis of the ratio of the treading force of the right leg and the treading force of the left leg of the user, thereby determining the total lifting force share of each leg link 3. Then, this determined total lifting force share is generated in each leg link 3. Therefore, especially in a state wherein the lifting control ON/OFF switch 54 is ON, a lifting force set using the key switch 53, i.e., a desired lifting force, can be applied smoothly and safely to the user A from the seat 2. This makes it possible to effectively reduce a load on the legs of the user A.

Supplementally, a total desired lifting force is the value obtained by adding a value of a lifting force set through the key switch 53 (a desired lifting force) and the magnitude of a supporting force for supporting a weight obtained by subtracting the total weight of the portions under the supporting force sensors 30 from the weight of the entire walking assist apparatus 1 (or the weight of the entire walking assist apparatus 1), or more accurately, the value obtained by passing the result of the addition through a low-pass filter, as described above. Thus, determining the total lifting force share of each leg link 3 as described above eventually distributes a desired lifting force, which is the desired value of the lifting force to be applied to the user A from the seat 2, to the right and left leg links 3R and 3L on the basis of the ratio between the treading force of the right leg and the treading force of the left leg of the user. Then, the electric motors 27L, 27R of the leg links 3L, 3R are controlled such that the distributed desired lifting force shares to be borne by the leg links 3R and 3L, respectively, act on the seat 2 from the leg links 3R and 3L.

Further, in the present embodiment, the spring restoring force is generated in each leg link 3, so that the walking assist apparatus 1 provides a larger lifting force as the user A bends his/her knee or knees deeper. This arrangement enables the user A to easily acquire the feeling of being assisted by the walking assist apparatus 1. Furthermore, setting the spring constant k related to a spring restoring force (refer to the above expression (6)) to a proper value makes it possible to restrain the posture of the leg links 3 from diverging to inappropriate postures.

When the lifting control ON/OFF switch 54 is OFF, the total lifting force Fankle_t is determined as a total desired lifting force. In this state, therefore, it is possible to maintain the seat 2 and the user A in a balanced state wherein no acting force is generated while the seat 2 is in contact with the user A, unless the user A intentionally applies his/her weight to the seat 2. In this state, when the lifting control ON/OFF switch 54 is turned ON, a lifting force can be smoothly applied to the user A while preventing a lifting force from being suddenly applied to the user A from the seat 2.

Moreover, the indicator current values of the electric motors 27 are determined according to the PD control law (the feedback control law) and the feedforward control law in combination, thus permitting quick and stable lifting force control.

In the embodiments described above, a spring restoring force has been added to the desired value, i.e., the control desired value, of a total lifting force share of each leg link 3; alternatively, however, the addition of the spring restoring force may be omitted. More specifically, the processing of S305, S307, S310, and S312 shown in FIG. 10 may be omitted. In this case, the Fankle_t determined in S301 of FIG. 10 may be directly input to S302.

Further, in the first embodiment described above, the treading force measurers 60 have used the table shown in FIG. 7. Alternatively, however, the table shown in FIG. 7 may be replaced by, for example, the table shown in FIG. 14 to convert the provisional measurement value FRF_p of a treading force of each leg into the measurement value FRF. This will be explained as a second embodiment. In the table shown in FIG. 14 in the second embodiment, an FRF takes a negative value if a provisional measurement value FRF_p is smaller than a threshold value FRF1. More specifically, according to the table shown in FIG. 14, if the FRF_p takes a value between the threshold value FRF1 and a threshold value FRF3 (FRF3>0 in this example), which is slightly smaller than the FRF1, then the FRF linearly decreases as the FRF_p decreases. If the FRF_p further decreases to be smaller than the threshold value FRF3 (including a case where FRF_p<0), then the FRF is maintained at a constant negative value, namely, the value of FRF when FRF_p=FRF3.

While the user A is walking, if the right leg is lifted, then the outputs of the MP sensor 38R and the heel sensor 39R will be extremely small values (a value in the vicinity of zero or a negative value), depending on the kinetic acceleration at that time, causing the provisional measurement value FRF_p_R to be smaller than the threshold value FRF1. At this time, the measurement value FRF_R of the treading force of the right leg obtained using the table shown in FIG. 14 takes a negative value.

Figure 14:
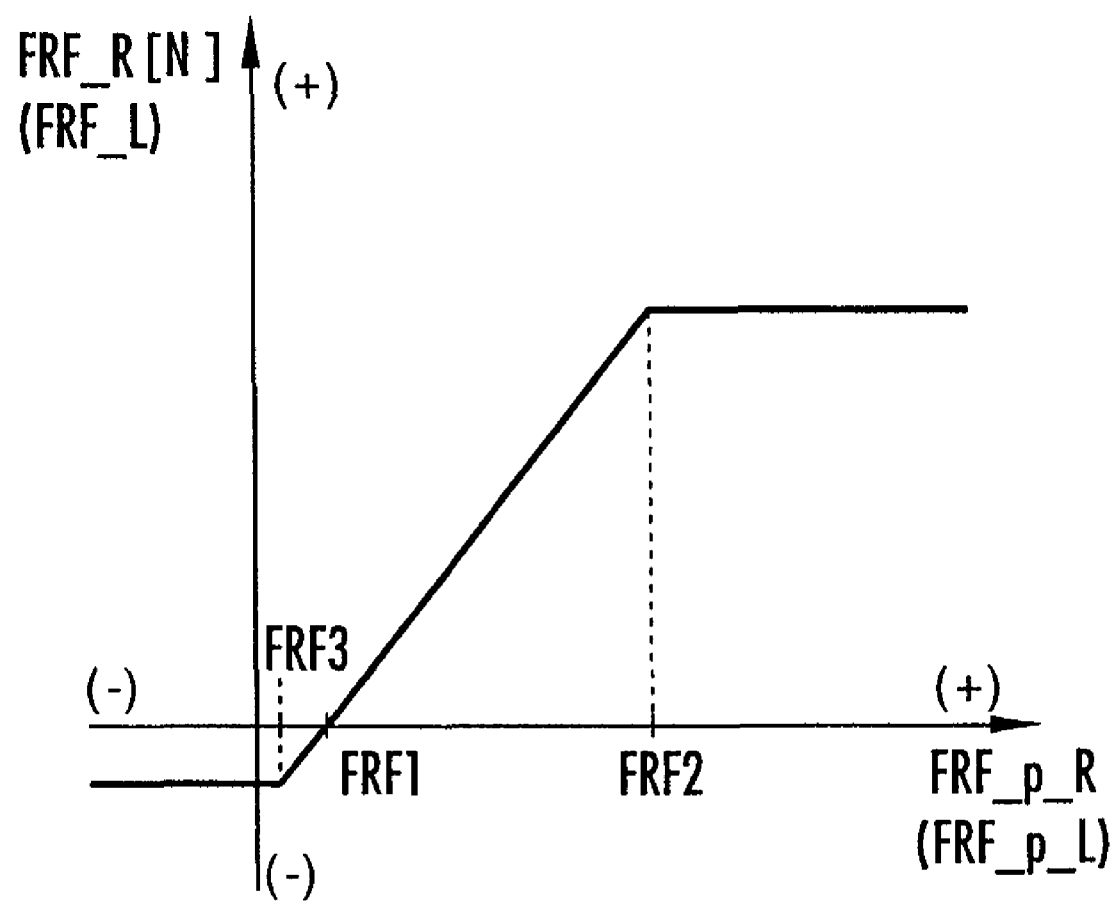
FIG. 14 is a graph showing a table used in a second embodiment of the present invention.

Further, in the second embodiment, if the measurement value FRF_R of a negative value is obtained using the table shown in FIG. 14, then a part of the processing shown in FIG. 10 (the processing of the right/left desired lifting force determiner 63) is changed, for example, as follows. If the measurement value FRF_R of a negative value is obtained in S304 of FIG. 10, then the ratio between the two distribution ratios is set to a predetermined ratio established beforehand. For instance, if FRF_R<0, as mentioned above, then the left distribution ratio to the right distribution ratio is set to 1.1 to −0.1. In other words, of the left distribution ratio and the right distribution ratio, the distribution ratio associated with the FRF of a negative value is set to a predetermined negative value (−0.1 in the present embodiment), while the other distribution ratio is set to a value obtained by subtracting the predetermined negative value from 1, that is, the sum of the right and left distribution ratios is 1. Then, the distribution ratios are used to carry out the processing of S306 and S311. At this time, if, for example, the desired total lifting force, which is an output of S303 shown in FIG. 10, is 200 N, then the outputs of S306 and S311 will be −20 N and 220 N, respectively. A leg for which the provisional measurement value FRF_p that is smaller than the threshold value FRF1 has been obtained (the right leg in the aforesaid example) is determined as a free leg, and the processing for calculating a spring restoring force for the free leg in S305 or S310 is not carried out. In other words, the spring restoring force associated with the free leg is set to zero. With this arrangement, at the start of an one-leg supporting period (a period in which only one leg is standing), the second joint 12 of the leg link 3 of the free leg is driven to bend, making it possible to assist the user A with lifting the free leg.

In the embodiments described above, the first force sensor is composed of the MP sensor 38 and the heel sensor 39, these sensors 38 and 39 being provided in the foot-worn assemblies 15 such that they are located between the sole of the foot of a standing leg of the user A and a floor, as shown in FIG. 3; however, the mounting position of the first force sensor is not limited thereto. The first force sensor may alternatively be provided in the foot-worn assembly as shown in, for example, FIG. 15. This case will be explained below as a third embodiment.

Figure 15:
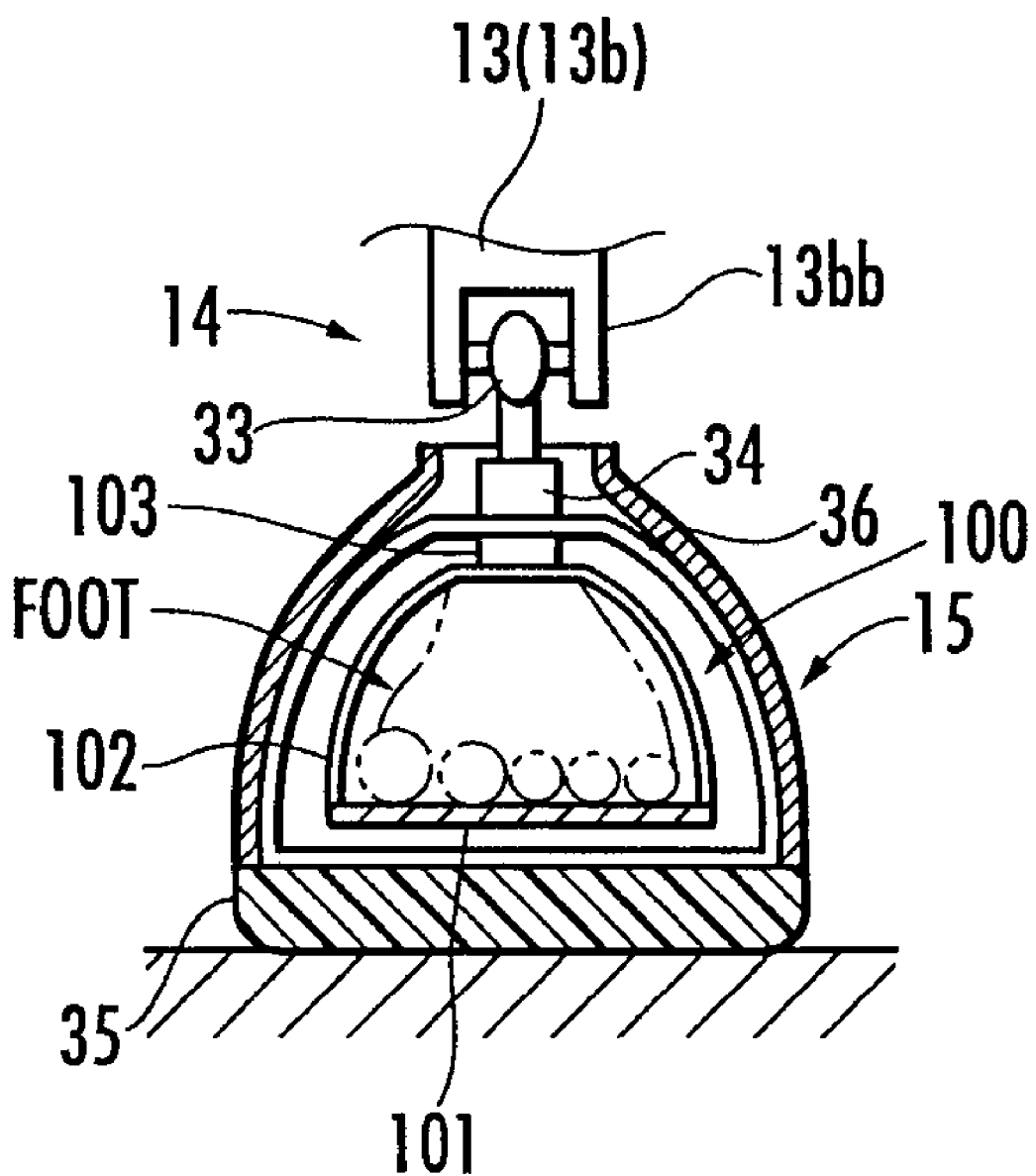
FIG. 15 is a diagram showing the construction of a foot-worn assembly in a third embodiment of the present invention.

Referring to FIG. 15, in the third embodiment, a foot supporting member 100 is provided inside the annular member 36 of a foot-worn assembly 15. The foot supporting member 100 shaped like a slipper is composed of a plate-like foot sole member 101 (a member like a sole insert of a shoe) that comes in contact with substantially the entire bottom surface of a foot of a user A and an arched member 102 having an approximately semicircular arc-shaped section that is connected to the foot sole member 101. The arched member 102 has its both lower ends connected integrally with both sides of the foot sole member 101. The toe portion of a foot of the user A can be inserted in the arched member 102. With the toe portion inserted therein, the foot is supported on the foot sole member 101. These foot sole member 101 and the arched member 102 are formed of a material, such as a metal or resin, having a predetermined rigidity.

Further, a tensile strength sensor 103 constituting a first force sensor is provided between the outer surface of the top of the arched member 102 and the inner surface of the top of the annular member 36. The tensile strength sensor 103 is connected to the arched member 102 and the annular member 36. The tensile strength sensor 103 is formed of, for example, a tensile load cell. In this case, the foot supporting member 100 is disposed inside the annular member 36 such that it is in contact with neither the annular member 36 nor a shoe 35. With this arrangement, the foot supporting member 100 is suspended in the annular member 36 through the intermediary of the tensile strength sensor 103 so that a force for supporting the foot supporting member 100 from under acts from neither the annular member 36 nor the shoe 35.

A cushion for protecting a foot of the user A may be provided on the upper surface of the foot sole member 101 or the inner surface of the arched member 102.

This completes the explanation of the construction of the foot-worn assembly 15 in the present embodiment. The foot-worn assembly 15 in the present embodiment does not have the MP sensor 38, the heel sensor 39, and the sole insert 37. To attach the foot-worn assembly 15 of the present embodiment to each foot of the user A, the toe portion of the foot is inserted in the arched member 102 of the foot supporting member 100, and the foot is inserted into the shoe 35 through the top opening of the shoe 35, placing the foot on the foot sole member 101.

In the walking assist apparatus having the foot-worn assembly 15 constructed as described above, the treading force of a leg of the user A that is a standing leg will be detected by the tensile strength sensor 103 as a tensile strength acting on the tensile strength sensor 103.

In the present embodiment, outputs of the tensile strength sensors 103 of the right and left foot-worn assemblies 15 instead of outputs of the MP sensor 38 and the heel sensor 39 are supplied to treading force measurers 60 of an arithmetic processor 51. Each of the treading force measurers 60 obtains a force detection value, which is represented by an output of the tensile strength sensor 103 associated therewith (the tensile strength taking a positive value) and which has been passed through a low-pass filter, as the provisional measurement value FRF_p of each leg of the user A. Further, each treading force measurer 60 determines the measurement value FRF of a treading force according to the table shown in FIG. 7 or the table shown in FIG. 14 from the provisional measurement value FRF_p.

The construction and processing other than those explained above are the same as those of the first embodiment or the second embodiment described above.

The present embodiment is also capable of providing advantages similar to those of the first embodiment or the second embodiment described above. In the present embodiment, the tensile strength sensor 103 is provided between the uppermost portion of the inner peripheral surface of the annular member 36 and the uppermost portion of the outer peripheral surface of the arched member 102; however, the position where the tensile strength sensor 103 is installed is not limited thereto. The tensile strength sensor 103 may alternatively be installed on the upper, diagonal portion or on a side surface of the arched member 102 so that it is provided between the arched member 102 and the annular member 36. Further alternatively, two or more tensile strength sensors may be provided between the arched member 102 and the annular member 36, and the foot supporting member 100 may be suspended in the annular member 36 through the intermediary of the plurality of tensile strength sensors. In this case, a treading force may be measured on the basis of the total sum of the force detection values indicated by outputs of the tensile strength sensors, as with the first embodiment in which a treading force has been measured on the basis of the total sum of the force detection values of the MP sensor 38 and the heel sensor 39.

What is claimed is:

1. A walking assist apparatus having a control device, a seat that receives a part of the weight of a sitting user from above, a pair of right and left thigh frames respectively connected to the seat through the intermediary of first joints, a pair of right and left crus frames respectively connected to the thigh frames through the intermediary of second joints, a pair of right and left foot-worn assemblies that are respectively connected to the crus frames through the intermediary of third joints, respectively adapted to be attached to the feet of the right and left legs of the user, and come in contact with the ground when the legs of the user become standing legs, an actuator for the left for driving the second joint among the joints of the left leg link composed of the first joint, the thigh frame, the second joint, the crus frame, the third joint, and the foot-worn assembly on the left side, and an actuator for the right for driving the second joint among the joints of the right leg link composed of the first joint, the thigh frame, the second joint, the crus frame, the third joint, and the foot-worn assembly on the right side, wherein the control device comprises:
a treading force measuring means for measuring a treading force of each leg of the user on the basis of a force detection value indicated by an output of a first force sensor provided in each of the foot-worn assemblies;
a desired lifting force setting means for setting a desired lifting force, which is a desired value of an upward lifting force to be applied to the user from the seat;
a distributing means for determining a desired share for the left leg link and a desired share for the right leg link out of the desired lifting force by distributing the desired lifting force to the leg links on the basis of a ratio between the treading force of the left leg and the treading force of the right leg of the user; and
an actuator controlling means for controlling the actuator for the left such that the lifting force actually imparted to the seat from the left leg link becomes the desired share for the left leg link and also controlling the actuator for the right such that the lifting force actually imparted to the seat from the right leg link becomes the desired share for the right leg link.

2. The walking assist apparatus according to claim 1, wherein each of the foot-worn assemblies is equipped with an annular member for inserting a foot of the user, to which the foot-worn assembly is to adapted to be attached, from the toe end thereof, and connected to the third joint through the intermediary of the annular member.

3. The walking assist apparatus according to claim 2, wherein a foot supporting member for supporting a foot of the user is disposed inside an annular member of each of the foot-worn assemblies such that it does not come in contact with the annular member, and the foot supporting member is suspended in the annular member through the intermediary of the first force sensor.

4. The walking assist apparatus according to claim 1, wherein each of the first force sensors is composed of one or more force sensors provided in each foot-worn assembly such that, when a leg of the user becomes a standing leg, they are positioned between at least either the location of the metatarsophalangeal joint or the location of the heel of the foot on the bottom surface of the foot of the standing leg and a floor, and the treading force measuring means is a means that takes the total sum of the force detection values indicated by outputs of the force sensors constituting the first force sensor of each foot-worn assembly as a force detection value of the first force sensor and measures the treading force of a leg of the user that has the foot-worn assembly attached thereto on the basis of the force detection value of the total sum.

5. The walking assist apparatus according to claim 1, wherein when a force detection value of the first force sensor is a first threshold value or less, the treading force measured by the treading force measuring means of the foot to which the foot-worn assembly having the first force sensor attached is set to zero.

6. The walking assist apparatus according to claim 1, wherein when a force detection value of the first force sensor is a predetermined second threshold value or more, the treading force measured by the treading force measuring means of the foot to which the foot-worn assembly having the first force sensor attached is set to a predetermined upper limit value.

7. The walking assist apparatus according to claim 1, comprising:
a displacement amount sensor that generates an output based on a displacement amount of the second joint;
a joint displacement amount measuring means for measuring a displacement amount of each second joint on the basis of an output of the displacement amount sensor; and
a desired share correcting means that determines a deviation of a distance between the third joint and the seat from a predetermined reference value on the basis of a measured displacement amount of the second joint of each leg link and then corrects the desired share of each leg link such that the deviation approximates zero.

8. The walking assist apparatus according to claim 7, wherein the desired share correcting means comprises:
a means for determining a required force for bringing the deviation close to zero by a feedback control law on the basis of the deviation associated with the left leg link;
a means for determining a correction amount of the desired share of the left leg link by multiplying the determined required force by a ratio of a treading force of the left leg relative to the total sum of a treading force of the left leg and a treading force of the right leg of the user, and then correcting the desired share of the left leg link on the basis of the correction amount;
a means for determining a required force for bringing the deviation close to zero by the feedback control law on the basis of the deviation associated with the right leg link; and
a means for determining a correction amount of the desired share of the right leg link by multiplying the determined required force by the ratio of a treading force of the right leg relative to the total sum of a treading force of the left leg and a treading force of the right leg of the user, and then correcting the desired share of the right leg link on the basis of the correction amount.

9. A walking assist apparatus having a control device, a seat that receives a part of the weight of a sitting user from above, a pair of right and left thigh frames respectively connected to the seat through the intermediary of first joints, a pair of right and left crus frames respectively connected to the thigh frames through the intermediary of second joints, a pair of right and left foot-worn assemblies that are respectively connected to the crus frames through the intermediary of third joints, respectively adapted to be attached to the feet of the right and left legs of the user, and come in contact with the ground when the legs of the user become standing legs, an actuator for the left for driving the second joint among the joints of the left leg link composed of the first joint, the thigh frame, the second joint, the crus frame, the third joint, and the foot-worn assembly on the left side, and an actuator for the right for driving the second joint among the joints of the right leg link composed of the first joint, the thigh frame, the second joint, the crus frame, the third joint, and the foot-worn assembly on the right side,
wherein the control device comprises:
a treading force measuring means for measuring a treading force of each leg of the user on the basis of a force detection value indicated by an output of a first force sensor provided in each of the foot-worn assemblies;
a desired lifting force setting means for setting a desired lifting force, which is a desired value of an upward lifting force to be applied to the user from the seat;
a second force sensor provided between the bottom end of the crus frame and the third joint of each leg link or between the third joint and the foot-worn assembly of each leg link;
a force-to-be-controlled measuring means for measuring, as a force to be controlled, a force actually transmitted from the floor to the crus frame of each leg link on the basis of a force detection value indicated by an output of the second force sensor;
a total desired lifting force determining means for determining, as a total desired lifting force, the total sum of the desired lifting force and a supporting force for supporting on a floor the weight obtained by subtracting the total weight of the portions below the second force sensors in the walking assist apparatus from the weight of the entire walking assist apparatus or the total sum of the desired lifting force and a supporting force for supporting the weight of the entire walking assist apparatus on a floor;
a distributing means for determining a desired share for the left leg link and a desired share for the right leg link out of the total desired lifting force by distributing the total desired lifting force to the leg links on the basis of a ratio between a treading force of the left leg and a treading force of the right leg of the user; and an actuator controlling means for controlling the actuator for the left on the basis of a force to be controlled and a desired share of the left leg link such that the difference between the force to be controlled and the desired share of the left leg link approximates zero and for controlling the actuator for the right on the basis of a force to be controlled and a desired share of the right leg link such that the difference between the force to be controlled and the desired share of the right leg link approximates zero.

10. The walking assist apparatus according to claim 9, wherein each of the foot-worn assemblies is equipped with an annular member for inserting a foot of the user, to which the foot-worn assembly is to adapted to be attached, from the toe end thereof, and connected to the third joint through the intermediary of the annular member.

11. The walking assist apparatus according to claim 10, wherein a foot supporting member for supporting a foot of the user is disposed inside an annular member of each of the foot-worn assemblies such that it does not come in contact with the annular member, and the foot supporting member is suspended in the annular member through the intermediary of the first force sensor.

12. The walking assist apparatus according to claim 9, wherein each of the first force sensors is composed of one or more force sensors provided in each foot-worn assembly such that, when a leg of the user becomes a standing leg, they are positioned between at least either the location of the metatarsophalangeal joint or the location of the heel of the foot on the bottom surface of the foot of the standing leg and a floor, and the treading force measuring means is a means that takes the total sum of the force detection values indicated by outputs of the force sensors constituting the first force sensor of each foot-worn assembly as a force detection value of the first force sensor and measures a treading force of a leg of the user that has the foot-worn assembly attached thereto on the basis of the force detection value of the total sum.

13. The walking assist apparatus according to claim 9, wherein when a force detection value of the first force sensor is a first threshold value or less, the treading force measured by the treading force measuring means of the foot to which the foot-worn assembly having the first force sensor attached is set to zero.

14. The walking assist apparatus according to claim 9, wherein when a force detection value of the first force sensor is a predetermined second threshold value or more, the treading force measured by the treading force measuring means of the foot to which the foot-worn assembly having the first force sensor attached is set to a predetermined upper limit value.

15. The walking assist apparatus according to claim 9, comprising:
- a displacement amount sensor that generates an output based on a displacement amount of the second joint;
- a joint displacement amount measuring means for measuring a displacement amount of each second joint on the basis of an output of the displacement amount sensor; and
- a desired share correcting means that determines a deviation of a distance between the third joint and the seat from a predetermined reference value on the basis of a measured displacement amount of the second joint of each leg link and then corrects the desired share of each leg link such that the deviation approximates zero.

16. The walking assist apparatus according to claim 15, wherein the desired share correcting means comprises:

- a means for determining a required force for bringing the deviation close to zero by a feedback control law on the basis of the deviation associated with the left leg link;
- a means for determining a correction amount of the desired share of the left leg link by multiplying the determined required force by a ratio of a treading force of the left leg relative to the total sum of a treading force of the left leg and a treading force of the right leg of the user, and then correcting the desired share of the left leg link on the basis of the correction amount;
- a means for determining a required force for bringing the deviation close to zero by the feedback control law on the basis of the deviation associated with the right leg link; and
- a means for determining a correction amount of the desired share of the right leg link by multiplying the determined required force by the ratio of a treading force of the right leg relative to the total sum of a treading force of the left leg and a treading force of the right leg of the user, and then correcting the desired share of the right leg link on the basis of the correction amount.

17. The walking assist apparatus according to claim 9, comprising a selector switch for indicating whether to carry out a lifting force control,
wherein when the selector switch is in an operation state indicating that the lifting force control should be conducted, then the total desired lifting force determining means determines, as a total desired lifting force, the total sum of the desired lifting force and the supporting force for supporting on a floor the weight obtained by subtracting the total weight of the portions below the second force sensors in the walking assist apparatus from the weight of the entire walking assist apparatus or the total sum of the desired lifting force and a supporting force for supporting the weight of the entire walking assist apparatus on a floor, and when the selector switch is in an operation state indicating that the lifting force control should not be conducted, then the total sum of the forces-to-be-controlled of both leg links measured by the force-to-be-controlled measuring means is determined as the total desired lifting force 18. The walking assist apparatus according to claim 9, comprising:
- a displacement amount sensor that generates an output based on a displacement amount of the second joint;
- a joint displacement amount measuring means for measuring a displacement amount of each second joint on the basis of an output of the displacement amount sensor;
- a desired share correcting means that determines a deviation of a distance between the third joint and the seat from a predetermined reference value on the basis of a measured displacement amount of the second joint of each leg link and then corrects the desired share of each leg link such that the deviation approximates zero; and
- a selector switch for indicating whether to carry out a lifting force control,
wherein when the selector switch is in an operation state indicating that the lifting force control should be conducted, then the total desired lifting force determining means determines, as a total desired lifting force, the total sum of the desired lifting force and the supporting force for supporting on a floor the weight obtained by subtracting the total weight of the portions under the second force sensors of the walking assist apparatus from the weight of the entire walking assist apparatus or the total sum of the desired lifting force and the supporting force for supporting the weight of the entire walking assist apparatus on a floor, and when the selector switch is in an operation state indicating that the lifting force control should not be conducted, then the total desired lifting force determining means determines, as the total desired lifting force, the value obtained by subtracting the correction amount of a desired share of each of both leg links supplied by the desired share correcting means from the total sum of the forces-to-be-controlled of both leg links measured by the force-to-be-controlled measuring means.

* * * * *